United States Patent
Young

(10) Patent No.: US 9,854,936 B2
(45) Date of Patent: Jan. 2, 2018

(54) PORTABLE CAMPING AND SURVIVAL STOVE

(71) Applicant: Clifford Kenneth Young, Sonora, CA (US)

(72) Inventor: Clifford Kenneth Young, Sonora, CA (US)

(73) Assignee: James Fisher

( * ) Notice: Subject to any disclaimer, the term of this patent is extended or adjusted under 35 U.S.C. 154(b) by 1039 days.

(21) Appl. No.: 13/872,019

(22) Filed: Apr. 26, 2013

(65) Prior Publication Data

US 2014/0209083 A1    Jul. 31, 2014

Related U.S. Application Data

(60) Provisional application No. 61/687,629, filed on Apr. 26, 2012.

(51) Int. Cl.
  *A47J 33/00*    (2006.01)
  *A47J 36/26*    (2006.01)

(52) U.S. Cl.
  CPC ............... *A47J 33/00* (2013.01); *A47J 36/26* (2013.01); *Y10T 29/49826* (2015.01)

(58) Field of Classification Search
  CPC ............... A47J 33/00; A47J 2037/0777; A47J 37/0763; F24C 3/14; F24C 15/12; F24C 1/16
  USPC ............................................ 126/25 R, 29, 30
  See application file for complete search history.

(56) References Cited

U.S. PATENT DOCUMENTS

| 163,202 | A | * | 5/1875 | Houston | F24C 3/14 126/30 |
| 1,049,416 | A | * | 1/1913 | Snider | F24C 1/16 126/258 |
| 1,050,113 | A | * | 1/1913 | Eichelkraut | A47J 36/26 126/246 |
| 1,210,099 | A | * | 12/1916 | Pohl | F23C 99/00 126/43 |
| 1,221,514 | A | * | 4/1917 | Crain | F24B 1/205 126/29 |
| 1,298,762 | A | * | 4/1919 | Milligan | A47J 33/00 110/119 |
| 1,754,968 | A | * | 4/1930 | Smith | A47J 37/0694 30/322 |

(Continued)

*Primary Examiner* — Avinash Savani
*Assistant Examiner* — Deepak Deean
(74) *Attorney, Agent, or Firm* — Lyman Moulton, Esq.

(57) ABSTRACT

A portable camping and survival stove includes a stand comprising a pair of flat stock lower cross-members adjoined via a complementary slot in each member, each lower cross-member having a lower edge and a pair of double tabs spaced apart on an upper edge configured to secure on a shelf there between a lower edge of a rigid container. The disclosed stove also includes a cook top comprising a pair of flat stock upper cross-members adjoined via a complementary slot in each member, each upper cross-member having an upper cooking edge and a pair of double tabs spaced apart on a lower edge configured to secure on a shelf there between an upper edge of the rigid container. Furthermore, the rigid container may be a discarded can or a collapsible four-sided container for flammable material and include holes for air flow in a bottom and at least one side thereof.

10 Claims, 24 Drawing Sheets

(56) References Cited

U.S. PATENT DOCUMENTS

| | | | | |
|---|---|---|---|---|
| 1,879,837 A * | 9/1932 | Bierlich | F24C 1/16 | 126/43 |
| 2,190,139 A * | 2/1940 | Stockell | F24B 1/202 | 126/25 R |
| 2,332,117 A * | 10/1943 | Shepherd | A47J 37/108 | 126/214 C |
| 2,335,020 A * | 11/1943 | Nehrich | F24C 15/10 | 126/43 |
| 2,376,640 A * | 5/1945 | Wall | A47J 37/0694 | 126/337 R |
| 2,397,766 A * | 4/1946 | Tullis | F23D 11/44 | 126/304 R |
| 2,597,127 A * | 5/1952 | Rahr | A47J 37/08 | 126/215 |
| 2,965,097 A * | 12/1960 | Clark, Jr. | A47J 37/06 | 126/30 |
| 3,062,127 A * | 11/1962 | Lang | A45C 11/20 | 126/275 R |
| 3,109,420 A * | 11/1963 | Ott | F24C 1/16 | 126/9 R |
| 3,213,849 A * | 10/1965 | Hirsch | F24C 5/20 | 126/304 R |
| 3,406,679 A * | 10/1968 | Law | A47J 36/30 | 126/262 |
| 3,416,510 A * | 12/1968 | Paulson | A47J 37/0763 | 126/215 |
| 3,523,396 A * | 8/1970 | Jonge | E04C 2/423 | 52/668 |
| 4,023,474 A * | 5/1977 | Dixon | A47J 37/08 | 126/9 R |
| 4,100,912 A * | 7/1978 | Doane | F24C 1/16 | 126/43 |
| 4,211,206 A * | 7/1980 | Darbo | A47J 37/0763 | 126/25 R |
| 4,358,958 A * | 11/1982 | Wehrenberg | G12B 9/08 | 248/150 |
| 4,450,759 A * | 5/1984 | Steibel | A47J 37/0694 | 211/189 |
| 4,532,910 A * | 8/1985 | Longley, Jr. | F24B 1/205 | 126/29 |
| 4,794,906 A * | 1/1989 | Longley, Jr. | F24C 1/16 | 126/38 |
| 4,832,295 A * | 5/1989 | Wagner | F24C 15/10 | 126/215 |
| 4,971,045 A * | 11/1990 | Probst | F24B 1/205 | 126/29 |
| 5,117,808 A * | 6/1992 | Peters | F24C 3/14 | 126/25 R |
| 5,366,189 A * | 11/1994 | Thompson | B60R 7/02 | 224/539 |
| 5,372,342 A * | 12/1994 | Adams | A47B 13/06 | 248/150 |
| 5,624,041 A * | 4/1997 | Van Druff, Jr. | A47F 7/06 | 211/30 |
| 5,915,371 A * | 6/1999 | Hering | F24C 1/16 | 126/30 |
| 6,213,115 B1 * | 4/2001 | Anderson | A47J 33/00 | 126/46 |
| D453,372 S * | 2/2002 | Pecoskie | D23/332 | |
| 6,488,023 B2 * | 12/2002 | Pecoskie | F24C 5/20 | 126/43 |
| 7,107,983 B1 * | 9/2006 | West | A47J 33/00 | 126/25 R |
| 2001/0035178 A1 * | 11/2001 | Pecoskie | F24C 5/20 | 126/44 |
| 2002/0063422 A1 * | 5/2002 | Few | B60G 3/12 | 280/789 |
| 2004/0250807 A1 * | 12/2004 | Reiner | F24C 1/16 | 126/9 R |
| 2006/0065264 A1 * | 3/2006 | Huggins | F24C 5/20 | 126/43 |
| 2011/0214663 A1 * | 9/2011 | Cox | A47J 36/2477 | 126/25 R |
| 2012/0204852 A1 * | 8/2012 | Boucher | F24C 1/16 | 126/30 |
| 2013/0081607 A1 * | 4/2013 | Weyandt | A47J 33/00 | 126/29 |

* cited by examiner

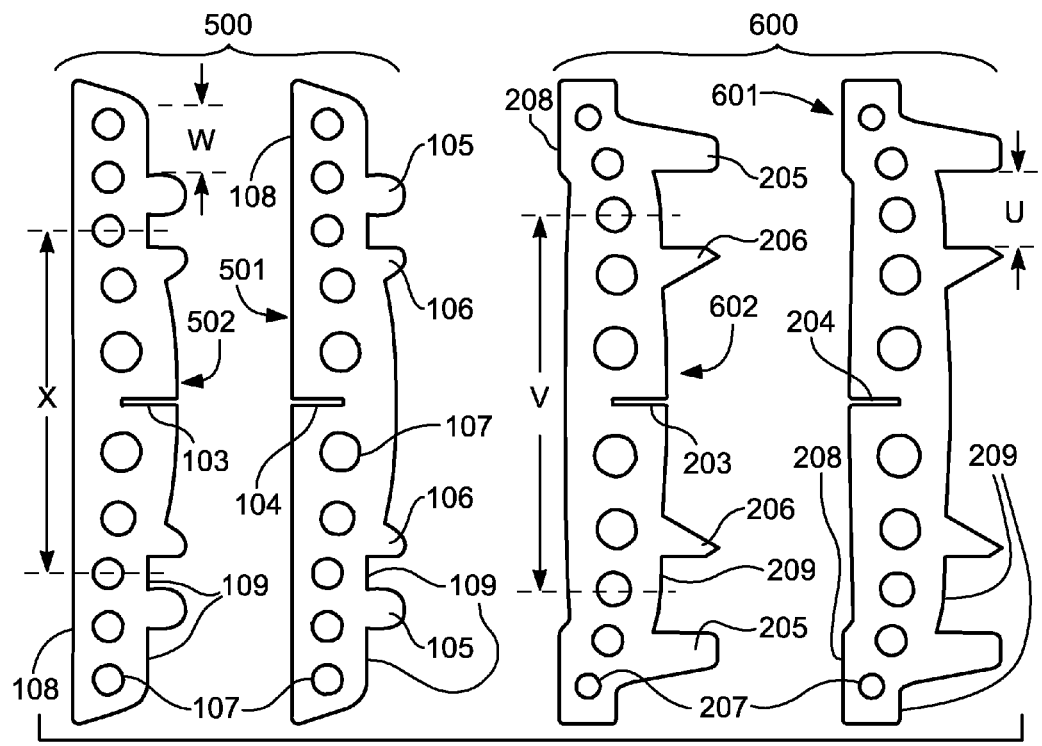
FIG. 4A
FIG. 4B
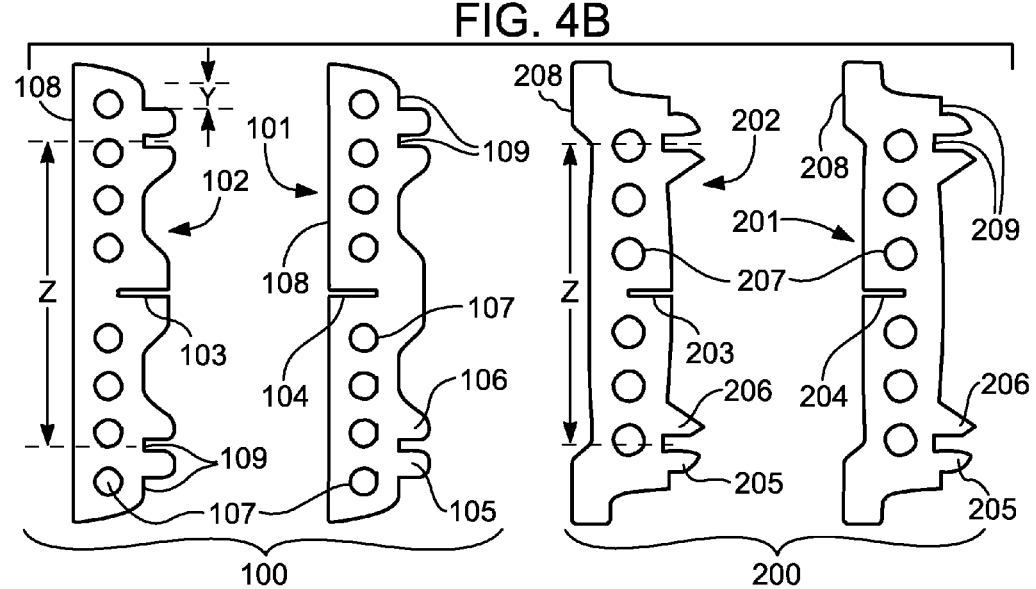

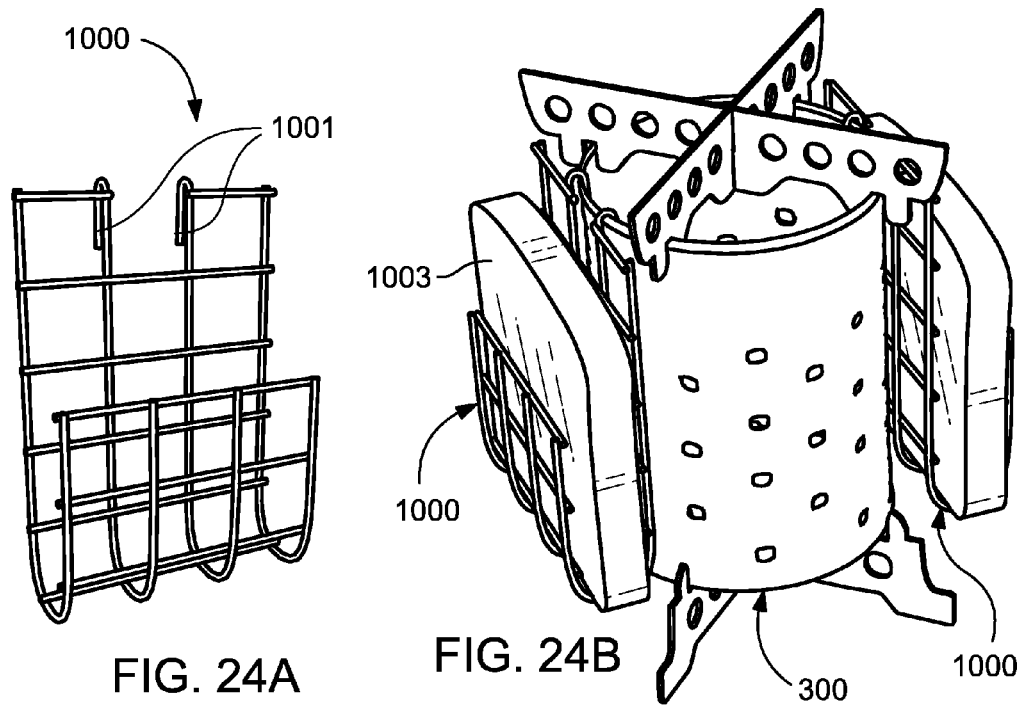
FIG. 24A
FIG. 24B
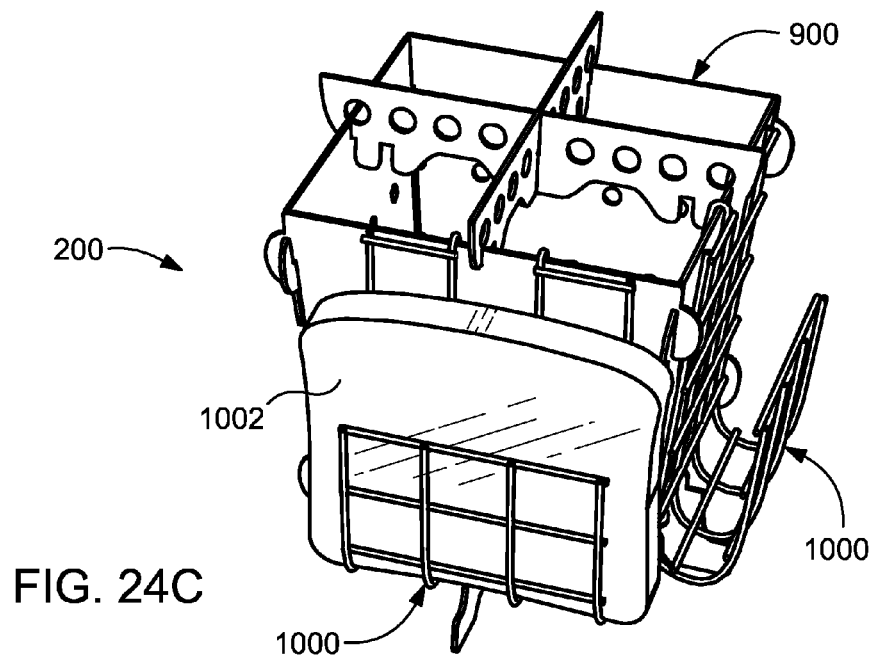
FIG. 24C

PORTABLE CAMPING AND SURVIVAL STOVE

CROSS-REFERENCE TO RELATED APPLICATION

This application claims the benefit of the priority date of earlier filed U.S. Provisional Patent Application Ser. No. 61/687,629, titled 'Portable Camping and Survival Stove' filed Apr. 26, 2012 for Clifford Kenneth Young, incorporated herein by reference in its entirety.

BACKGROUND OF THE INVENTION

The disclosure is in the field of portable outdoor camping and survival stoves. Camping and survival stoves are available in a wide variety of different configurations. Many of these require pre-packaged flammable fuels to operate liquid fuels like kerosene or solid fuel. These types of stoves require their users to carry or keep a sufficient quantity of fuel with them in order to provide for the duration of their trip or disaster survival. This is impractical for extended camping or backpacking trips because of the amount of fuel that needs to be packed. It is also an impractical solution for extended survival situations because of the difficulty that is likely to be associated with finding the necessary fuel.

Backpackers and people on the move during a disaster are particularly sensitive to the weight and space requirements of their gear. The fuel costs also add up and for extended durations can be substantial. There are also many other camping stoves designed to burn wood or collected scraps of wood, bark, pinecones, etc. which, in most locations are usually a relatively abundant resource that can be collected as needed.

In order to be lightweight and portable enough for backpacking, some of these products may be compactable. In some cases they may also be impractically small and flimsy. The better products tend to be expensive however. Some incorporate battery-dependent motors to power integrated fans to aid air flow into the fire, which also add to the cost and complexity of the product. Electronics also have greater potential for breakdown and should not be depended on for a fail-safe long-term survival stove solution.

SUMMARY OF THE INVENTION

A portable camping and survival stove as disclosed herein, includes a stand comprising a pair of flat stock lower cross-members adjoined via a complementary slot in each member, each lower cross-member having a lower edge and a pair of tabs spaced apart on an upper edge configured to secure on a shelf there between a lower edge of a rigid container. The disclosed stove also includes a cook top comprising a pair of flat stock upper cross-members adjoined via a complementary slot in each member, each upper cross-member having an upper cooking edge and a pair of double tabs spaced apart on a lower edge configured to secure on a shelf there between an upper edge of the rigid container. Furthermore, the rigid container may comprise holes for air flow in a bottom and at least one side thereof, the container configured to contain flammable material and have a lower edge and an upper edge thereof.

A method of making a portable camping and survival stove is also disclosed. The method comprising providing the stand and the cook top and securing the lower container edge onto the upper edge of the lower cross-members and securing the upper container edge onto the lower edge of the upper cross-members. An embodiment of the disclosure further includes securing the lower container edge onto the shelf between the lower cross-member double tabs and securing the upper container edge onto the shelf between the upper cross-member double tabs.

Other aspects and advantages of embodiments of the disclosure will become apparent from the following detailed description, taken in conjunction with the accompanying drawings, illustrated by way of example of the principles of the disclosure.

BRIEF DESCRIPTION OF THE DRAWINGS

FIG. 4A depicts side views of the larger cross-members including a pair of upper cross-members on the left and a pair of lower cross-members on the right in accordance with an embodiment of the present disclosure.

FIG. 4B depicts side views of smaller cross-members including a pair of upper cross-members on the left and a pair of lower cross-members on the right in accordance with an embodiment of the present disclosure.

FIG. 24A illustrates a toaster attachment or accessory which may be hung from the upper edge of either a can stove or the collapsible flat-sided fire-container in accordance with an embodiment of the present disclosure.

FIG. 24B illustrates a perspective view of the toaster accessory disposed on the can secured to the lower cross-members in accordance with an embodiment of the present disclosure.

FIG. 24C illustrates a perspective view of the toaster accessory disposed on the collapsible flat-sided fire-container in accordance with an embodiment of the present disclosure.

Figure 1:
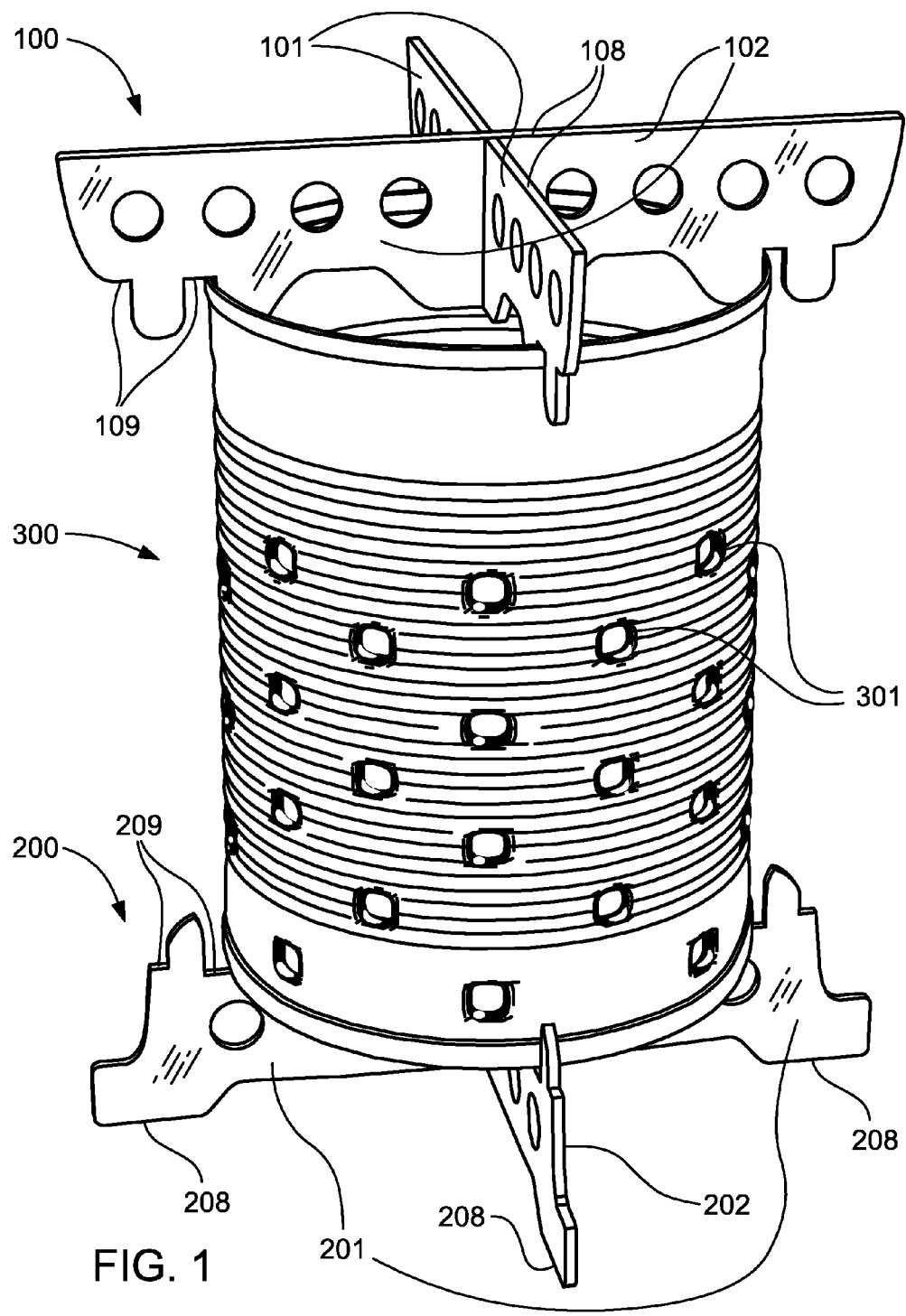
FIG. 1 illustrates a perspective view of a can with upper cross-members and with lower cross-members in accordance with an embodiment of the present disclosure.

Throughout the description, similar or same reference numbers may be used to identify similar or same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

The age-old "hobo stove" made from a large discarded food or beverage can continues to be a widely used means of containing a fire and its fuel because it easily provides a supporting structure for cookware such as a pan or pot. These impromptu stoves can be partially filled with scraps of wood fuel which, as mentioned, is in most situations a fairly abundant resource that can be gathered from one's surroundings. Such stoves therefore do not necessitate carrying the extra weight or dependency associated with petroleum derived fuels.

These 'can stoves' are typically constructed by removing the lid of a large can, emptying any contents and then punching or cutting an array of vent holes in the can wall and floor to provide adequate ventilation for the fire. The can generally needs to be propped up by some means in order to elevate it above the ground to allow for airflow through holes in the underside. Holes and support tabs fabricated in this manner are inherently flimsy, and do not provide for a stable base, or a stable pot/pan support.

A number of survival resources and online videos demonstrate the process of making these 'hobo' can stoves by cutting or punching said vent holes in a can, as well as modifying the bottom and top of the can to act respectively as a stand and pot/pan support. However, the process of making all of the necessary cuts and folds in the can metal is potentially dangerous and difficult, and results in a stove with exposed jagged edges. Even with the appropriate tool such as tin snips, one is at risk of slicing one's hand open. In a backpacking or survival situation where medical assistance may be unreachable, any attempt to create such a can is particularly unwise.

In addition, the resulting impromptu can stove is sub-optimal, with very flimsy and unstable legs and a weak and narrow upper surface upon which one can place a pan or pot or grille. Because of the narrow set of the legs and the narrow surface for supporting the pan or pot, the stove and the pan/pot are very prone to tipping over. This can waste valuable food and can scald the cook. In addition, the resulting can stove with its various jagged protrusions and leg flaps is not suitable for transport in one's gear because it is likely to damage fabrics and items around it or cut the user.

The disclosed portable camping and survival stove is able to leverage the benefits of using a can (cans are inexpensive and discarded ones can be found for free, are relatively easy to find and provide a good strong container for holding a fire and its fuel), while eliminating or minimizing the problems traditionally associated with creating and using a home-made can stove.

Embodiments of the disclosed stove is composed of a durable high-temperature-resistant material such as stainless steel or titanium and may comprise two pairs of cross-members that can be inter-connected just prior to each use to create both a stand to go underneath the can as well as a pot or pan support that is inserted into the top of the can. When not in use, the flat-sided cross-members can be detached from each other and stacked side-by-side and stored within the can, or in a very compact space. Users can take a can with them or use cans that they find as they travel. For efficient use of space during storage and transport, the can may be filled with firewood and other items such as matches or a magnesium fire starter.

In order to make a can suitable for use as a stove, one need only punch an array of small ventilation holes through the sides and floor of the can, which can be done with a tool such as an ice pick or pocket knife. These can be punched from the outside in, so that there are no rough or sharp spurs sticking out of the can. Pre-punched cans optionally can be provided or sold with the stove cross-members for added convenience. These pre-punched cans can also have an array of longer slots punched through or cut into the floor of the can to more readily accommodate pointed tabs on the lower cross-members. Said tabs on the cross-members help to hold the can securely to the cross-members. Since the upper cross-members that fit on top of the can provide plenty of space between the pot and the fire source for air and smoke to flow out of the can, there is no need to cut and bend out a vent near the top of the can. Also, since the lower cross-members provide a strong, stable stand for the can, there is no need to cut and bend out tabs in the floor of the can.

In an embodiment of the disclosure, the cross-members may be provided in more than one size to accommodate a wide range of can sizes. Two sizes of cross-members provide a good selection, with the smaller set ideal for individuals or two or three people and the larger set ideal for families and groups of three or more people, according to some embodiments. These two sizes will work with a wide variety of can sizes with some overlap in terms of the can sizes which can be used with either of them.

The cross-members may be constructed relatively inexpensively from sheet or plate metal by stamping out, die-cutting, laser cutting or water cutting the cross-member shapes. To set up the cross-members, simply orient each cross-member at ninety degrees to its complimentary cross-member and interconnect the slots. The can may then be pressed down onto the assembled stand to force the upward-facing points of the cross-members into their facing slots in the underside of the can and to snap the lower lip of can down such that it is gripped either on its inside or outside surfaces or both sides by the upward-pointing tabs or protrusions of the cross-members. The tabs and protrusions can be positioned and scaled so that they are compatible with different sized cans, with tabs optionally gripping the lower rim of the can either by the outside or inside perimeter surface of the rim, depending on the diameter of the rim, according to some embodiments. Similarly, the upper cross-members incorporate downward-pointing tabs that grip the upper lip of the can, either by the can's inside or outside surface. In this manner, the upper and lower rims of the can may optionally be gripped by the inward-facing or outward-facing edges of the tabs of the top and bottom cross-members. Once the can has been snapped down onto the lower cross-members, the upper cross-members can be slotted together at right-angles to each other and then the assembled pair snapped down onto the upper rim of the can.

The upward-facing points of the lower cross-members may be characterized by pointed tips, according to some embodiments, so that they can be forced through the floor of a can that has yet not been "pre-punched" with slots cut into its floor (bottom). The easiest way to perform this procedure is to invert the can and the lower cross-members and to then "hammer" the lower cross-members down onto the can floor using a solid object such as a wooden board, branch, mallet or rock. Once the pointed tabs have been fully pushed into the can floor such that the cross-members are now securely gripping the can, the assembled can with stand can be flipped back over and the upper cross-members pushed down onto the top rim of the can.

Prior to the attachment of the upper cross-members to the can, the can may be partially filled with fuel for the fire such as scraps of dry wood, pine-cones, wood shavings, bark, etc. The fire can be started from below or the sides by placing a lighted match below a hole under the can or through a hole in the side of the can or by dropping a match into the open top of the can, or by using other fire starters such as a magnesium striker. At any time after the fire has taken hold, the user may place a pan, pot or grill on top of the upper cross-members.

The user may prefer to wait for the flames to diminish to a point where they don't rise above the level of the can rim, in order to avoid blackening the pan or pot or burning the food. The can acts as a container for the fire and fuel as well as a wind-break and supporting structure for holding the upper-cross members. The can is relatively fuel-efficient and directs most of the heat generated upwards to the food above, and in this way a meal can be cooked with relatively little fuel.

Holes may be arrayed through the cross-members to lessen their weight without reducing the strength of the cross-members in any way relevant to their function. For example, a cross-member of approximately 2 mm thickness substantially flat stock, according to some embodiments, made from high-temperature stainless steel or titanium is virtually indestructible in normal use.

The term 'tab' used throughout the present disclosure, refers to a small flap or protrusion of material used to hold, secure or manipulate a larger part to which the tab is included. The term 'locking tab' used throughout the present disclosure therefore refers to tabs having complementary notches which are configured to slide into or fit together and therefore secure or interlock respective tabbed parts together. The term interstitial as used herein refers to an interval between closely spaced tabs. Therefore an interstitial space may refer to the shelf space between a double tab or even the space between a pair of double tabs.

FIG. 1 illustrates a perspective view of a can with upper cross-members and with lower cross-members in accordance with an embodiment of the present disclosure. The perspective view depicts a can 300 with upper cross-members 101 and 102 assembled together at ninety degrees to each other and attached to the can's upper rim to form a stable, level platform 100 for pots and pans. Lower cross-members 201 and 202 are assembled at ninety degrees to each other and attached to the can's underside to form a stable, level stand 200 for the can 300. An array of ventilation holes 301 made in the side wall of the can are visible. In this embodiment a small can 300 is shown attached to the small size cross-members. The can walls are gripping the inner tabs of the upper cross-members and the inside tabs of the lower cross-members and sit on the shelves 109 and 209 of the respective cross-members 101 and 102 and 201 and 202. The upper cross-members 101 and 102 therefore rest their shelves 109 against the upper rim or edge of the can. The flat upper surface 108 of the top cross-members 101 and 102 receives a cooking pot or pan or other cooking appliance. The feet 208 underneath the lower cross-members 201 and 202 elevate or offset the lower edge of the cross-members for placement of the stand on the ground or another surface.

An space between the interstitial shelf of each double tab pair on the lower and upper cross-members may accommodate cans from 3 and ⅛ inch (78 mm) to 4 inches (101.6 mm) and 5 and 1/16 inches (128.60 mm) and larger. Measurements for the spaces as detailed below include a plus or minus 10% manufacturing tolerance in order to accommodate the aforementioned cans and various other containers. In order to accommodate the most common can containers, a space between the shelf or interstitial space of each double tab on the lower and upper cross-members may measure approximately 78 mm to 128.60 mm and larger plus or minus a 10% manufacturing tolerance. Furthermore, in order to accommodate cans or containers of various sizes, the shelf or interstitial space itself between a double tab may measure approximately 3.12 mm to 11 mm and larger plus or minus a 10% manufacturing tolerance.

Measurements for the two sizes of cross-members, which in an embodiment of the disclosure may be referred to as "compact," and "large" may be taken as follows for an outer tab, then a slot (shelf), then an inner tab. Measurements for the upper compact cross-members from outside the outside tab to outside of the other outside tab (outside diameter O/D) measures 127 mm (5 inches) and the interstitial gap also known as the shelf or slot measures 0.3175 mm (⅛") wide. An outside of the inner tab to the outside of the other inner tab measures 100 mm (3 15/16 inches). NOTE: The tabs embodied in this array, will accommodate three different sized common cans, to wit: 4" (101.6 mm), and 4¼", and 5 1/16" (128.60 mm) O/D cans. The 4" can may have the tabs pressing against the inside of the can; the 4¼" can may have the tabs pressing against the outside of the can and the 5 1/16" can may have the outer tabs pressing against the outside of the can. The lower compact cross-members have tabs sharply pointed to enable them to be hammered into the bottom of the can. Measurements for the compact lower cross-members from outside the outside tab to outside of the other outside tab (O/D): 124 mm (4⅞") with an interstitial gap, slot or shelf is 5 mm (3/16") wide. An outside of the inner tab to the outside of the other inner tab may measure 98 mm (3⅞").

The large or larger upper cross-members measured from outside the outside tab to outside of the other outside tab (O/D) measure 154 mm (6⅛") with an interstitial gap, slot or shelf of 11 mm (7/16") wide. An outside of the inner tab to the outside of the other inner tab measures 106 mm (4 3/16"). The large or larger lower cross-members measured from inside of the outside cross members apart from one another measure 158 mm (6 3/16") and the outside of inner tabs to outside of inner tabs: 104 mm (4⅛")

Figure 2:
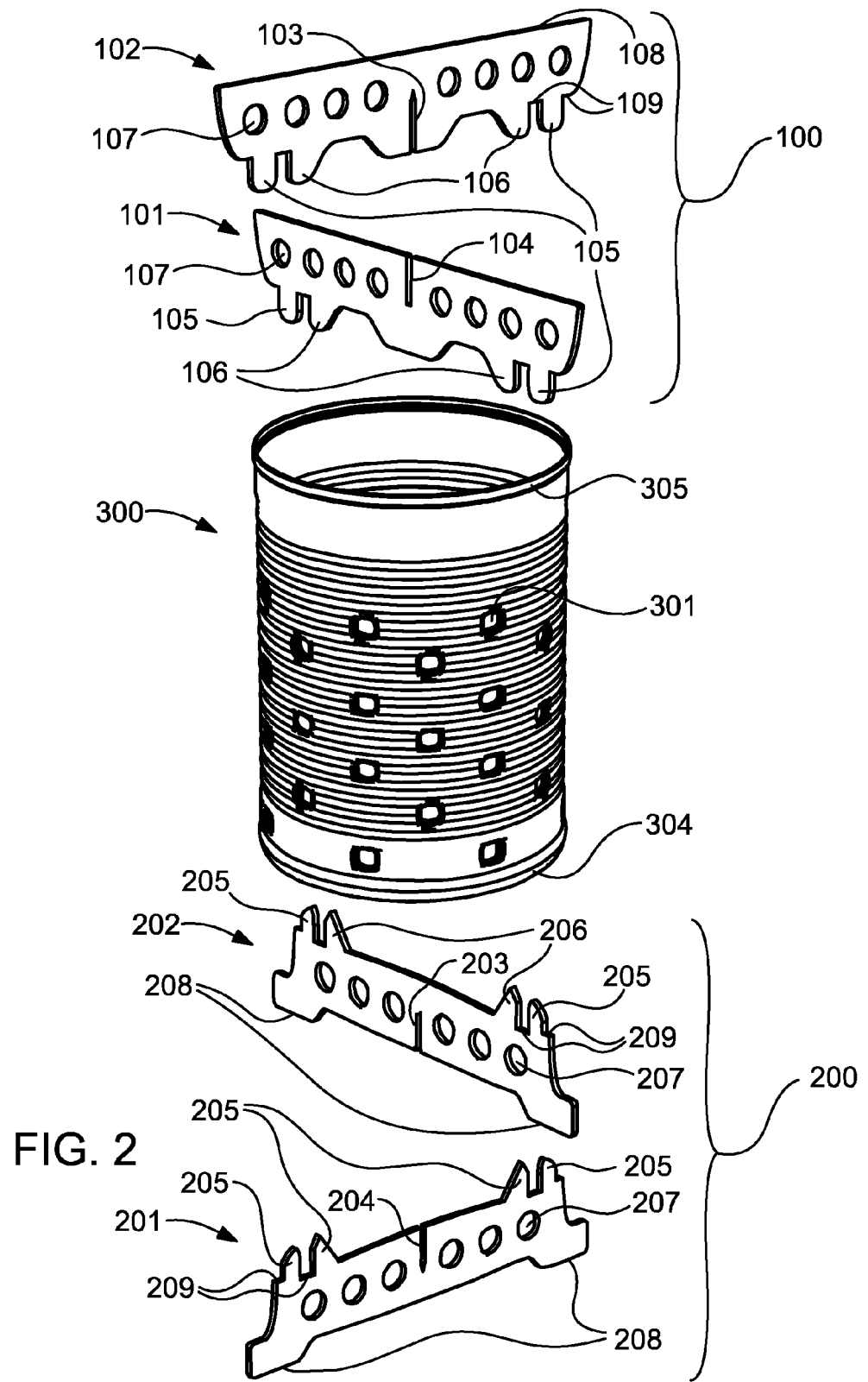
FIG. 2 depicts a perspective view of the can and cross-members all detached from each other in accordance with an embodiment of the present disclosure.

FIG. 2 depicts a perspective view of the can and cross-members all detached from each other in accordance with an embodiment of the present disclosure. The perspective view depicts the can 300 and cross-members 101, 102, 201 and 202 all detached from each other. Each cross-member is oriented at 90 degrees to its complementary cross-member so that they can be slotted together. Each cross-member has a slot 103, 104, 203 or 204 at its center that starts either at the cross-member's top or bottom, with its complimentary cross-member's slot facing in the opposite direction so that each pair of cross-members may be fitted together. A tab 105 and a tab 106 may comprise a double tab and two each double tabs comprise a pair of double tabs. Each of the pair of double tabs may be spaced apart or configured in order to secure two separate edges or lip portions of a can or container. The most stable configuration may involve spacings between each double tab approximating the radius of the can. The two cross-members disposed in a cross configuration of 90 degree inside angles may provide the most stable configuration but other configurations are comprised in embodiments of the disclosure. However, in embodiments of the present disclosure, a pair of tabs 205 or a pair of tabs 206 may secure the cross-members to the can container especially where each of the tabs of a pair are pointed or sharpened and may penetrate or cut into the bottom of a can container and thereby secure it thereto.

Figure 3:
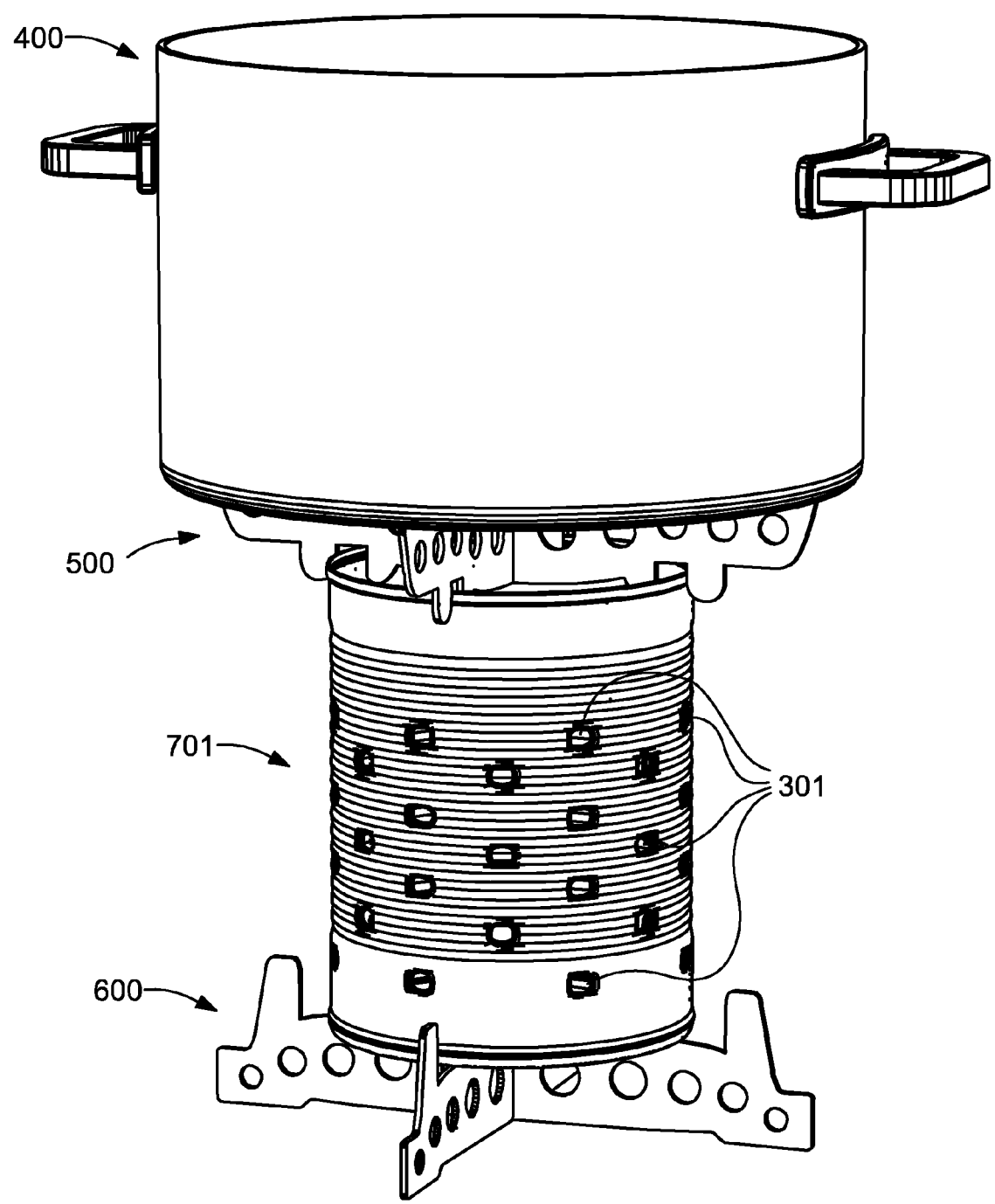
FIG. 3 depicts a perspective view of the assembled stove comprising larger cross members with a pot positioned on top in accordance with an embodiment of the present disclosure.

FIG. 3 depicts a perspective view of the assembled stove comprising larger cross members with a pot positioned on top in accordance with an embodiment of the present disclosure. The perspective depicts the stove, in which large size cross-member pairs 500 and 600 have been assembled together with a large can 701 and with a pot 400 positioned on top of the upper cross-member pair 500. The stand 600 securely holds the large can 701 level and broadens the base of the stove to make it more stable.

FIG. 4A depicts side views of the larger cross-members including a pair of upper cross-members on the left and a pair of lower cross-members on the right in accordance with an embodiment of the present disclosure. The depiction illustrates the large sized cross-members 501, 502, 601 and 602, according to some embodiments. On the left is a pair of upper cross-members 500 and on the right are the lower cross-member pair 600. The cross-members may incorporate a multiplicity of holes 107 and 207 in order to lighten their weight without compromising structural integrity. The cross-member pairs also incorporate central slots 103, 104, 203 and 204, each oriented either up or down so that each cross-member can be fitted to its complimentary paired cross-member when they are oriented at 90 degrees to each other. The upper cross-members also incorporate tabs 105 and 106, positioned such that they can grip the upper lip or outer wall of cans of various sizes. The lower cross-members also incorporate tabs 205 and 206, positioned such that they can grip the lower lip or outer wall of cans of various size. These lower tabs may be pointed so that they can be hammered into the floor of a can or pushed into pre-made slots in the floor of a can. Dimension U indicates the shelf space or interstitial space between tabs on the lower cross members 601 and 602. The dimension V indicates a space between the pair of double tabs which may be the same or similar for both cross-members 601 and 602. The dimension W depicted indicates the non-interstitial shelf space or outer shelf space on the upper cross members 501 and 502. The dimension X indicates the space between the pair of double tabs which may be the same or similar for both cross-members 501 and 502.

FIG. 4B depicts side views of smaller cross-members including a pair of upper cross-members on the left and a pair of lower cross-members on the right in accordance with an embodiment of the present disclosure. The depiction illustrates side views of the smaller sized cross-members 101, 102, 201 and 202, according to some embodiments. On the left is a pair of upper cross-members 100 and on the right are the lower cross-members 200. Just as with the large size cross-members, the small size cross-members incorporate central connector slots, holes and tabs. Dimension Z indicates a space between the pair of double tabs which may be the same or similar for both cross-members 101, 102 and 201, 202. The dimension Y depicted indicates the non-interstitial shelf space or outer shelf space on the upper cross members 101, 102 and 201, 202.

Figure 5:
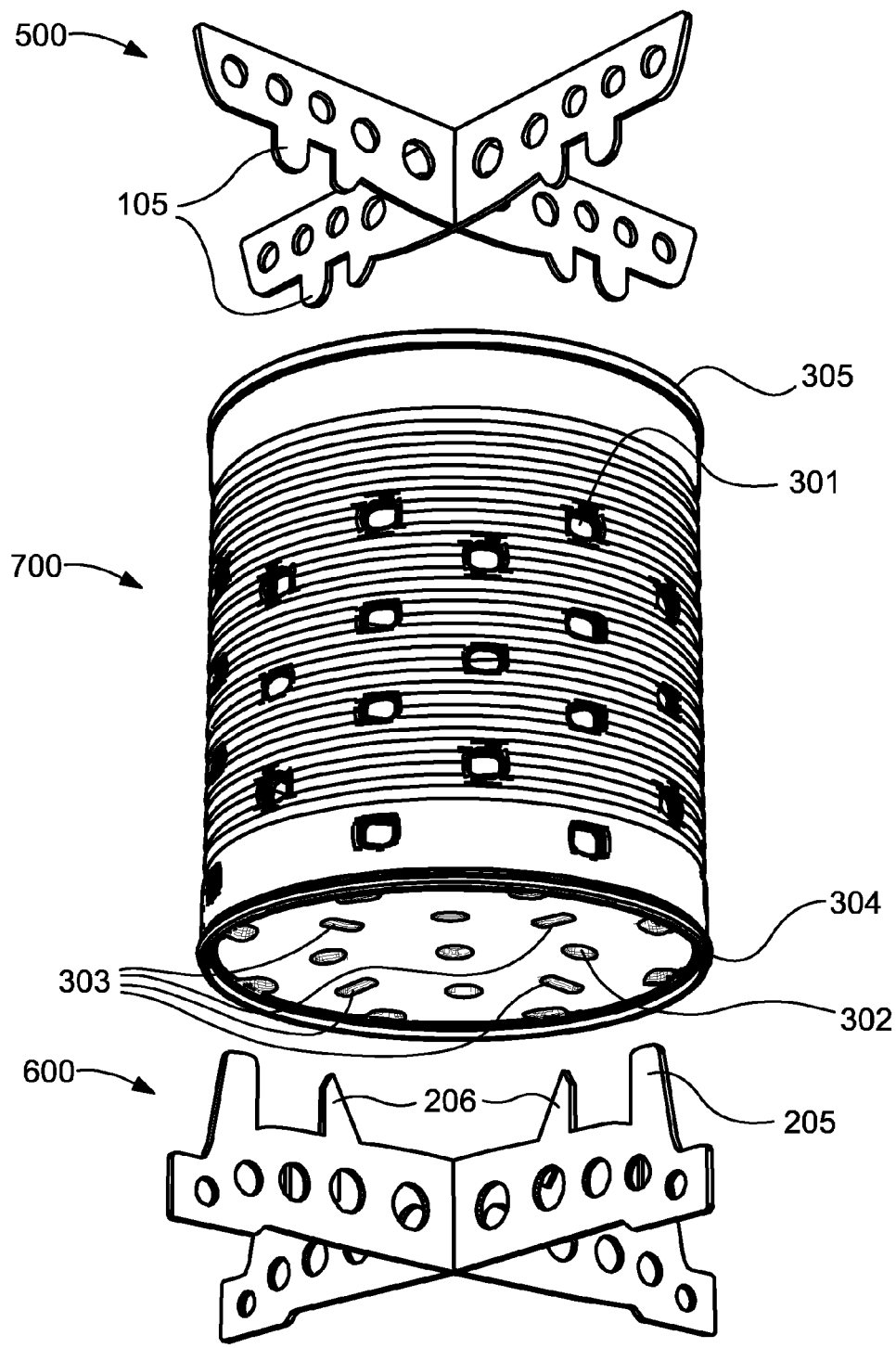
FIG. 5 illustrates a perspective view of the underside of an extra-large can with the larger upper and lower cross-member pairs assembled but detached from the can in accordance with an embodiment of the present disclosure.

FIG. 5 illustrates a perspective view of the underside of an extra-large can with the larger upper and lower cross-member pairs assembled but detached from the can in accordance with an embodiment of the present disclosure. The perspective view illustrates the underside of an extra-large can 700 with the large size upper and lower cross-member pairs 500 and 600 assembled but detached from the can. In addition to the ventilation holes 302 in the can floor, there are also slots 303 in the can floor to accommodate the inner tabs 206 of the lower cross-members. Said slots can be made by hammering the lower cross-member pair 600 onto the floor of the can.

Figure 6:
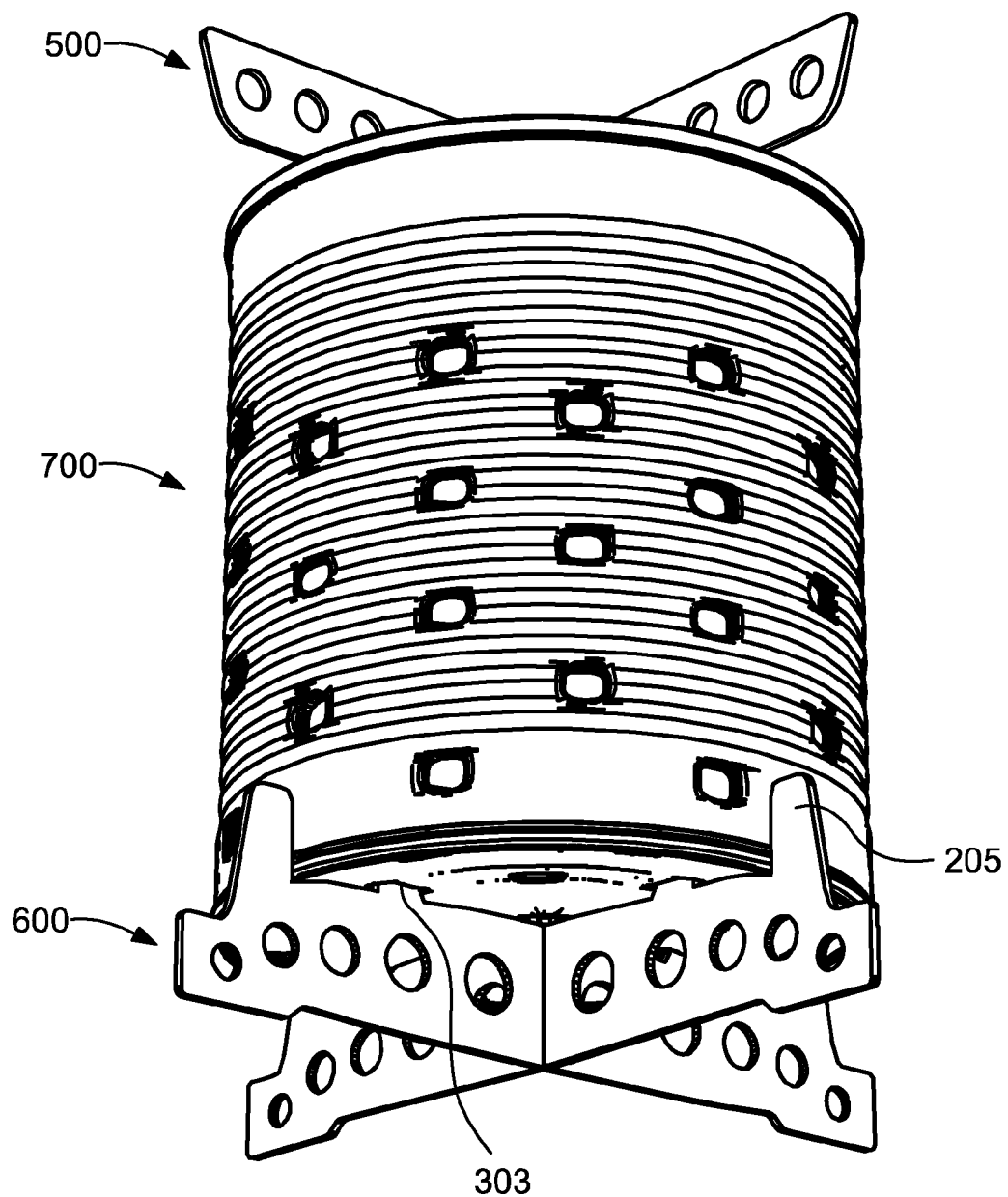
FIG. 6 illustrates a perspective view of the underside of an extra-large can with the larger upper and lower cross-member pairs assembled and attached to the can in accordance with an embodiment of the present disclosure.

FIG. 6 illustrates a perspective view of the underside of an extra-large can with the larger upper and lower cross-member pairs assembled and attached to the can in accordance with an embodiment of the present disclosure. The perspective view illustrates the underside of an extra-large can 700 with the large size upper and lower cross-member pairs 500 and 600 assembled and attached to the can. Outer tabs 205 on the lower cross-members grip the can sides.

Figure 7:
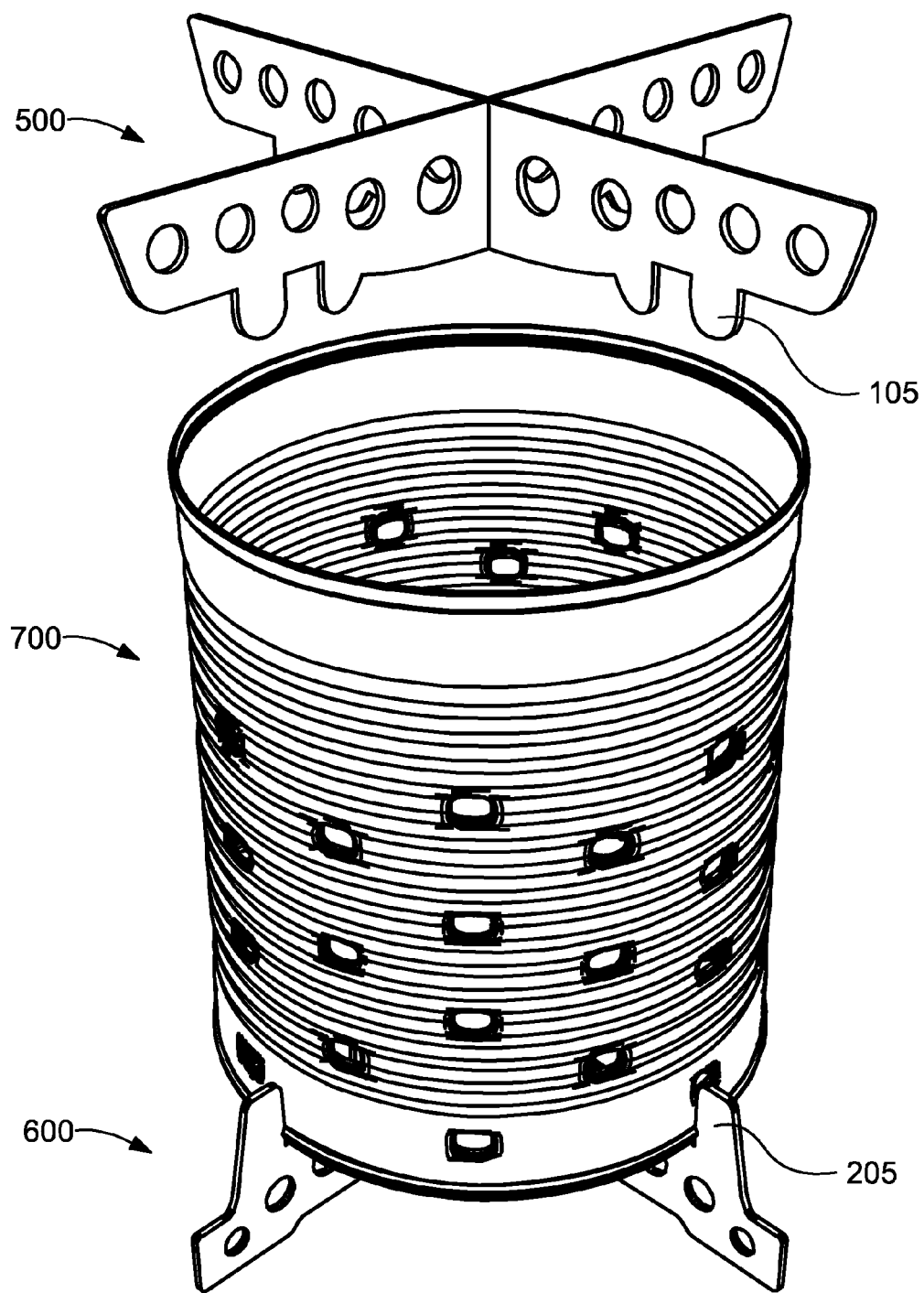
FIG. 7 illustrates a perspective view of the top of an extra-large can with the larger lower cross-member pairs assembled and attached to the can and the upper cross-members assembled but detached from the can in accordance with an embodiment of the present disclosure.

FIG. 7 illustrates a perspective view of the top of an extra-large can with the larger lower cross-member pairs assembled and attached to the can and the upper cross-members assembled but detached from the can in accordance with an embodiment of the present disclosure. The perspective view illustrates the top of an extra-large can 700 with the large size lower cross-members assembled to form a stand 600 and attached to the can. The upper cross-members 500 are assembled but detached from the can.

Figure 8:
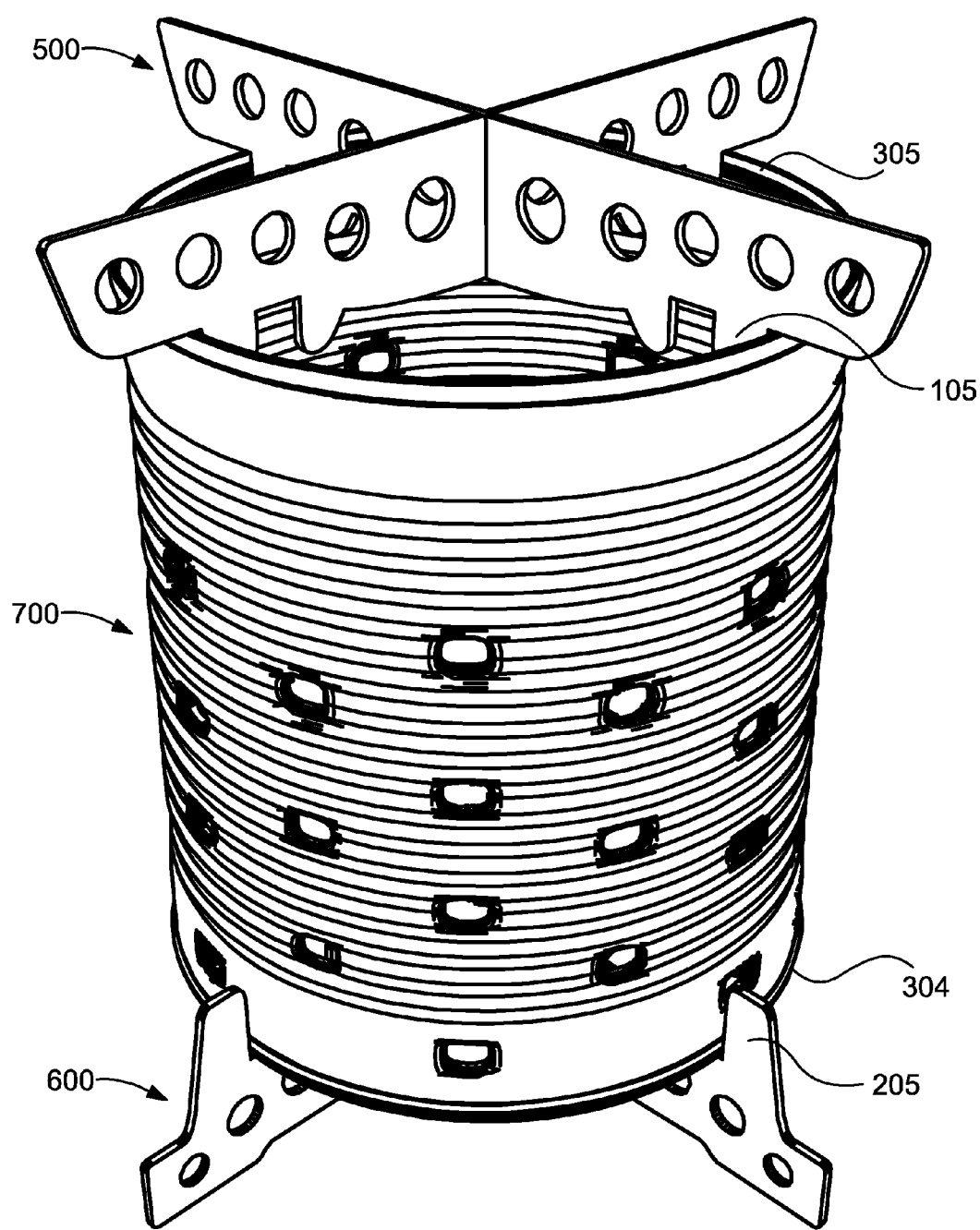
FIG. 8 illustrates a perspective view of the top of an extra-large can with the larger upper and lower cross-member pairs assembled and attached to the can in accordance with an embodiment of the present disclosure.

FIG. 8 illustrates a perspective view of the top of an extra-large can with the larger upper and lower cross-member pairs assembled and attached to the can in accordance with an embodiment of the present disclosure. The perspective view illustrates the top of an extra-large can 700 with the large size upper and lower cross-member pairs 500 and 600 assembled and attached to the can. It may be seen here that the can lip 305 grips the outside of the outmost tabs 105 of the upper cross-members 500. The lower lip 304 of the can grips the inside of the outer tabs 205 of the bottom cross-members. Said tabs help to hold the can in place relative to the cross-members.

Figure 9:
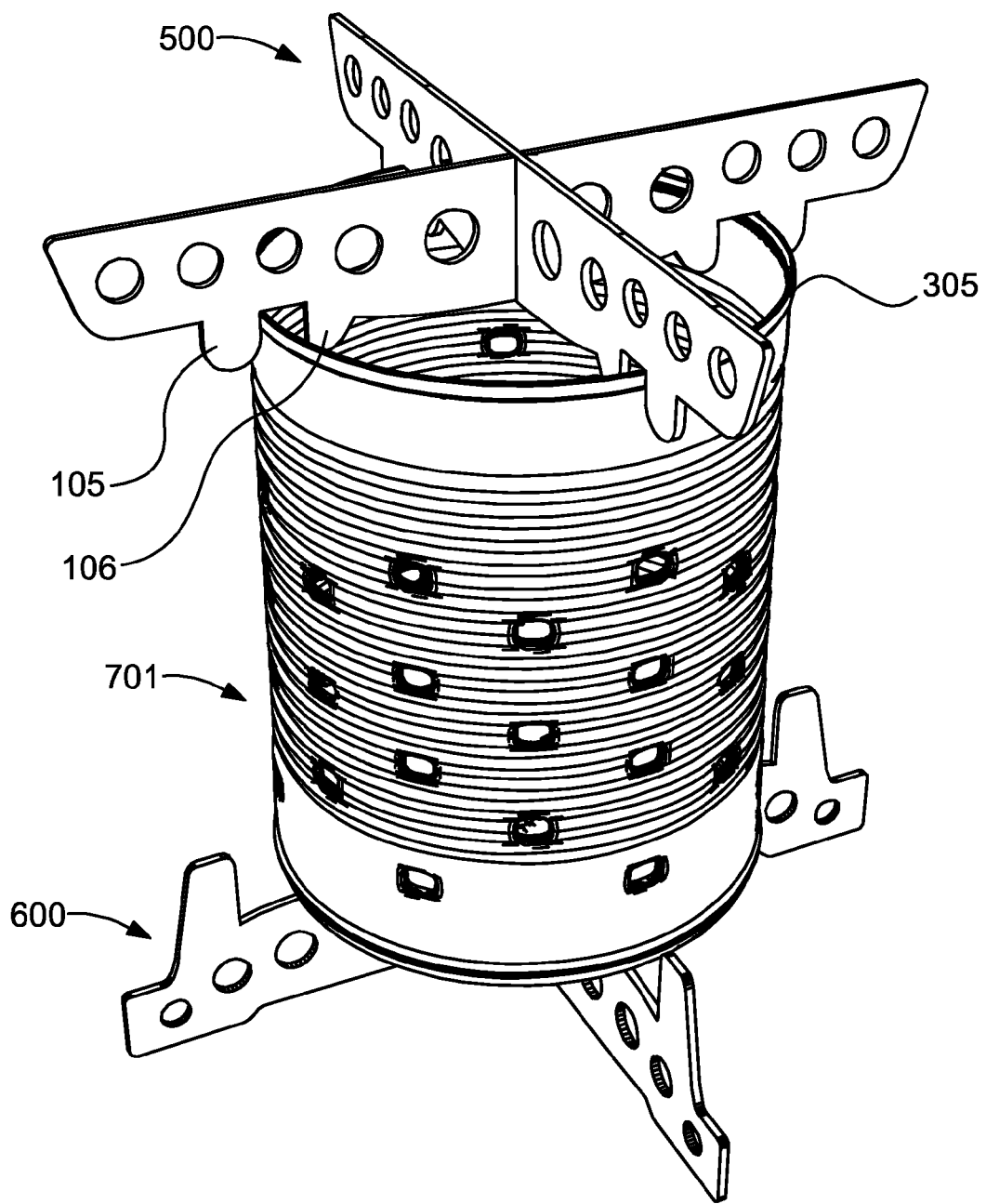
FIG. 9 illustrates a perspective view of the top of a large can with the larger cross-member pairs assembled and attached to the can in accordance with an embodiment of the present disclosure.

FIG. 9 illustrates a perspective view of the top of a large can with the larger cross-member pairs assembled and attached to the can in accordance with an embodiment of the present disclosure. The perspective view illustrates the top of a large can 701 with the large size cross-member pairs assembled and attached to the can. It can be seen here that the can lip 305 grips the inside of the outmost tabs 105 of the upper cross-members 500.

Figure 10:
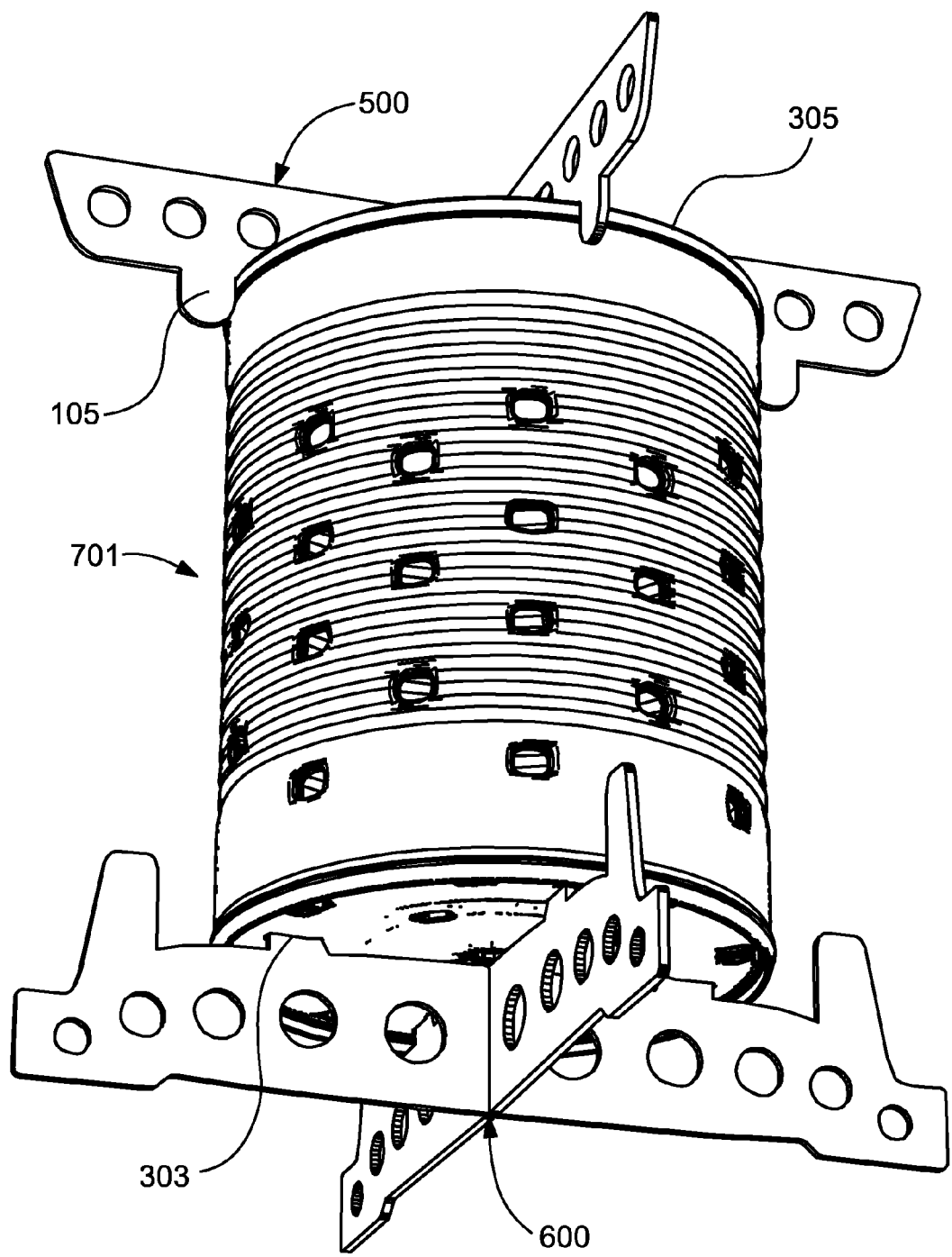
FIG. 10 illustrates a perspective view of the underside of a large can with the larger cross-member pairs assembled and attached to the can in accordance with an embodiment of the present disclosure.

FIG. 10 illustrates a perspective view of the underside of a large can with the larger cross-member pairs assembled and attached to the can in accordance with an embodiment of the present disclosure. The perspective view illustrates the underside of a large can 701 with the large size cross-member pairs 500 and 600 assembled and attached to the can. It can be seen here that the can wall grips the inside of the outmost tabs 105 of the upper cross-members 500. The inner tabs of the lower cross-members 600 have been pushed into slots 303 created in the bottom of the can in order to secure the can to the cross-members. These slots can be created by hammering the cross-members onto the can bottom.

Figure 11:
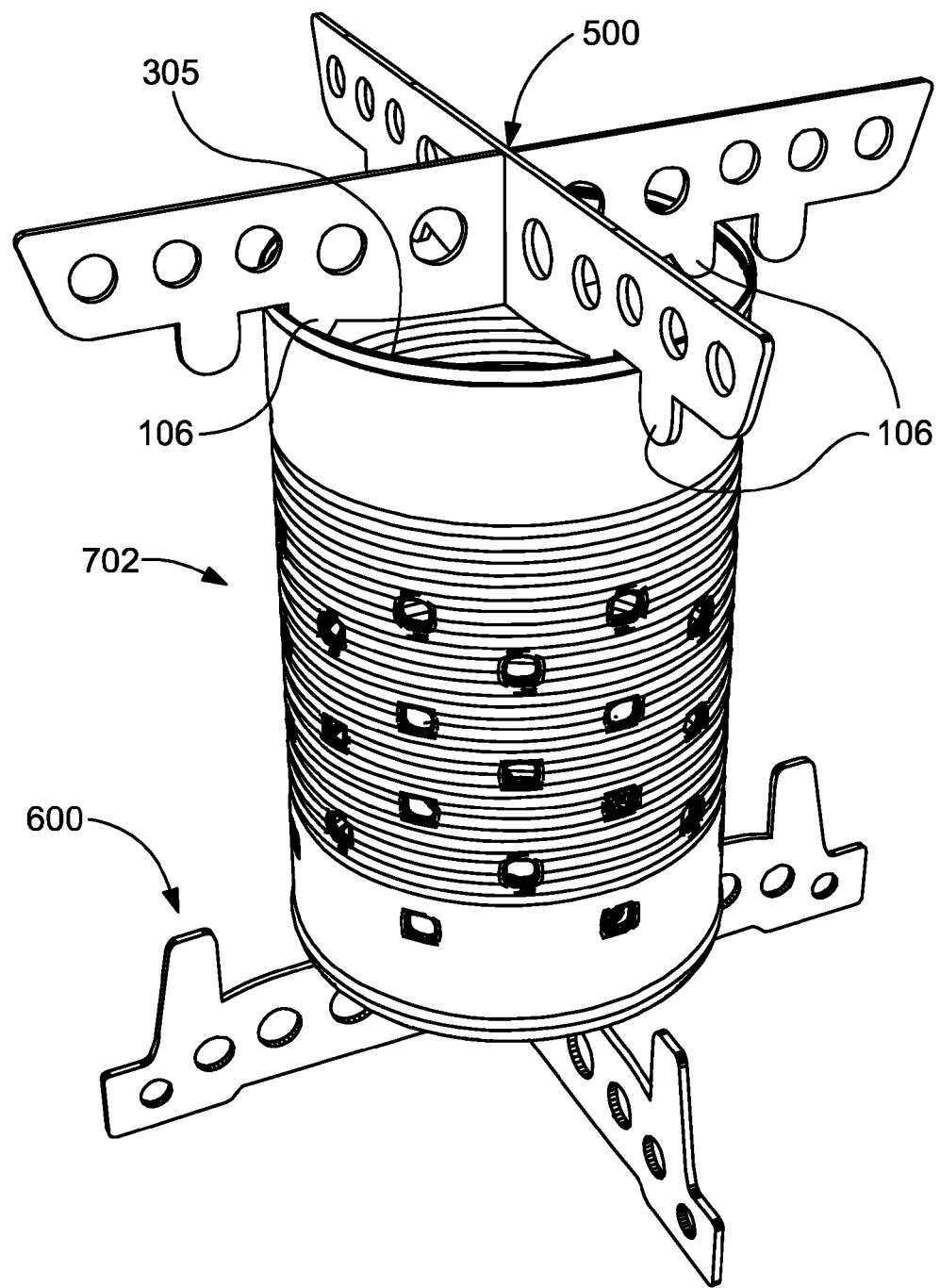
FIG. 11 illustrates a perspective view of the top of a medium size can with the larger cross-member pairs assembled and attached to the can in accordance with an embodiment of the present disclosure.

FIG. 11 illustrates a perspective view of the top of a medium size can with the larger cross-member pairs assembled and attached to the can in accordance with an embodiment of the present disclosure. The perspective view illustrates the top of a medium size can 702 with the large size cross-member pairs 500 and 600 assembled and attached to the can. It can be seen here that the can rim 305 grips the outside of the inner tabs 106 of the upper cross-members 500.

Figure 12:
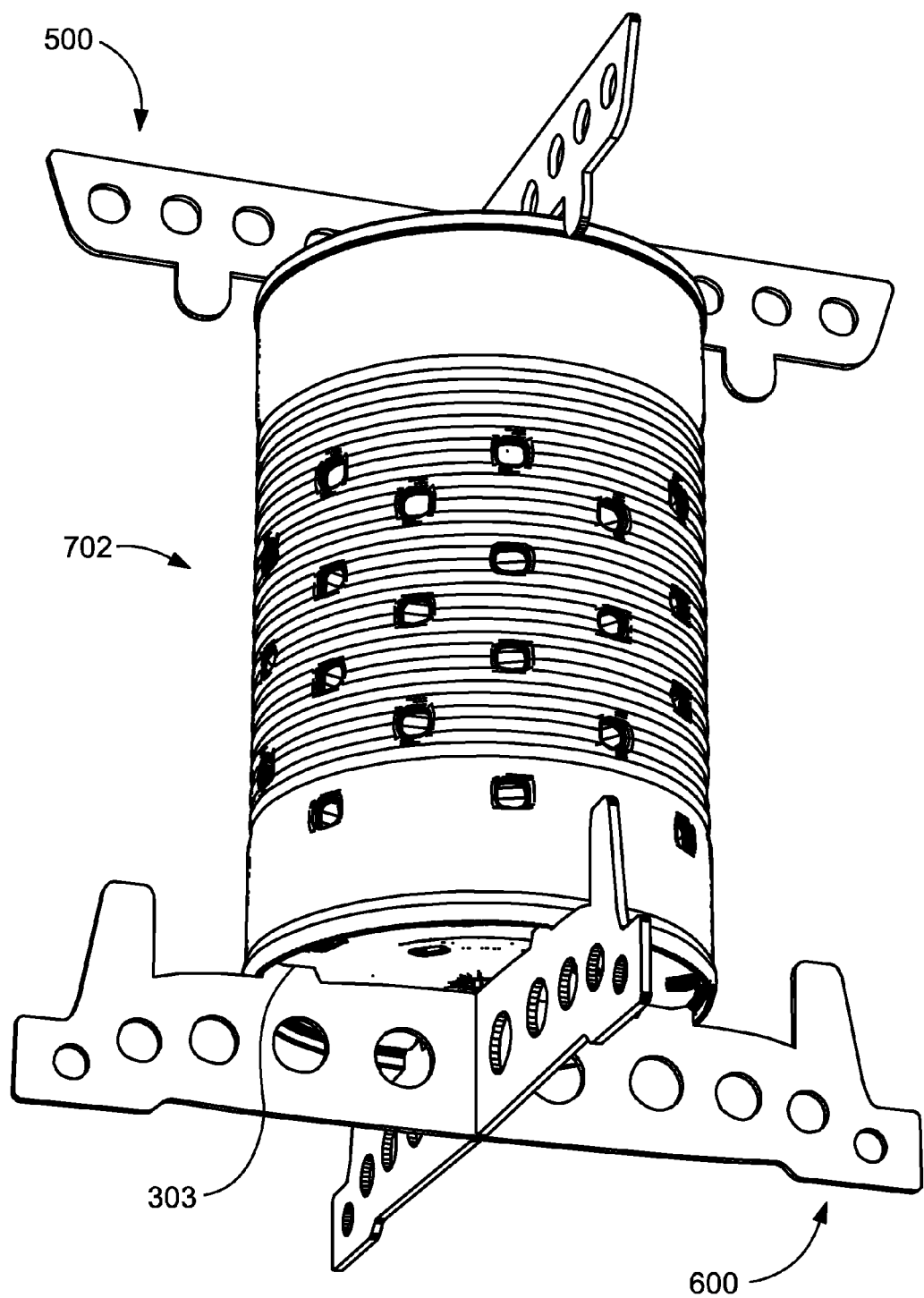
FIG. 12 illustrates a perspective view of the underside of a medium size can with the larger cross-member pairs assembled and attached to the can in accordance with an embodiment of the present disclosure.

FIG. 12 illustrates a perspective view of the underside of a medium size can with the larger cross-member pairs assembled and attached to the can in accordance with an embodiment of the present disclosure. The perspective view illustrates the underside of a medium size can 702 with the large size cross-member pairs 500 and 600 assembled and attached to the can. The inner tabs of the lower cross-members 600 have been pushed into slots 303 created in the bottom of the can in order to secure the can to the cross-members.

Figure 13:
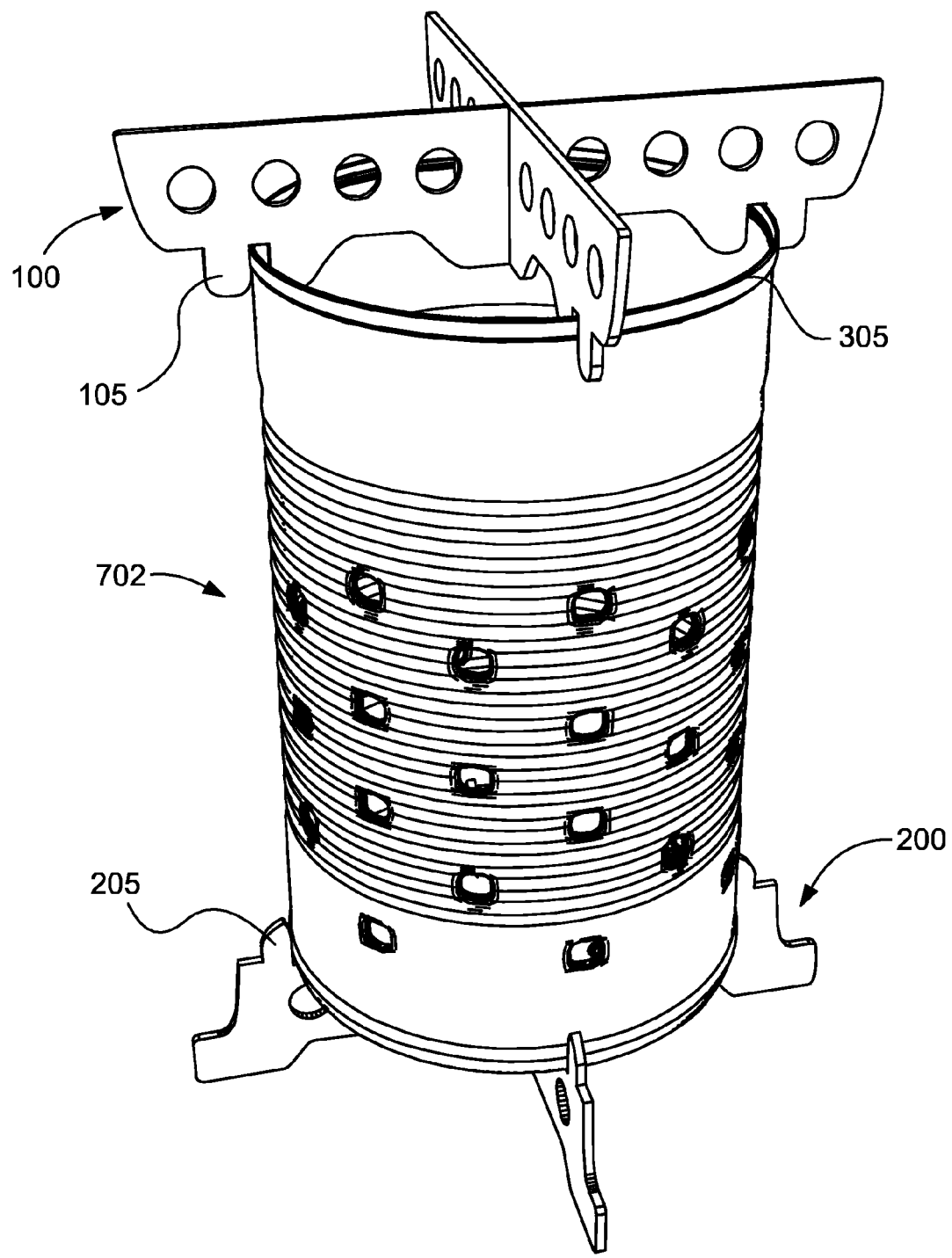
FIG. 13 illustrates a perspective view of the top of a medium size can with the small cross-member pairs assembled and attached to the can in accordance with an embodiment of the present disclosure.

FIG. 13 illustrates a perspective view of the top of a medium size can with the small cross-member pairs assembled and attached to the can in accordance with an embodiment of the present disclosure. The perspective view illustrates the top of a medium size can with the small size cross-member pairs 100 and 200 assembled and attached to the can. The can's upper rim is gripping the insides of the outer tabs 105 of the upper cross-members 100.

Figure 14:
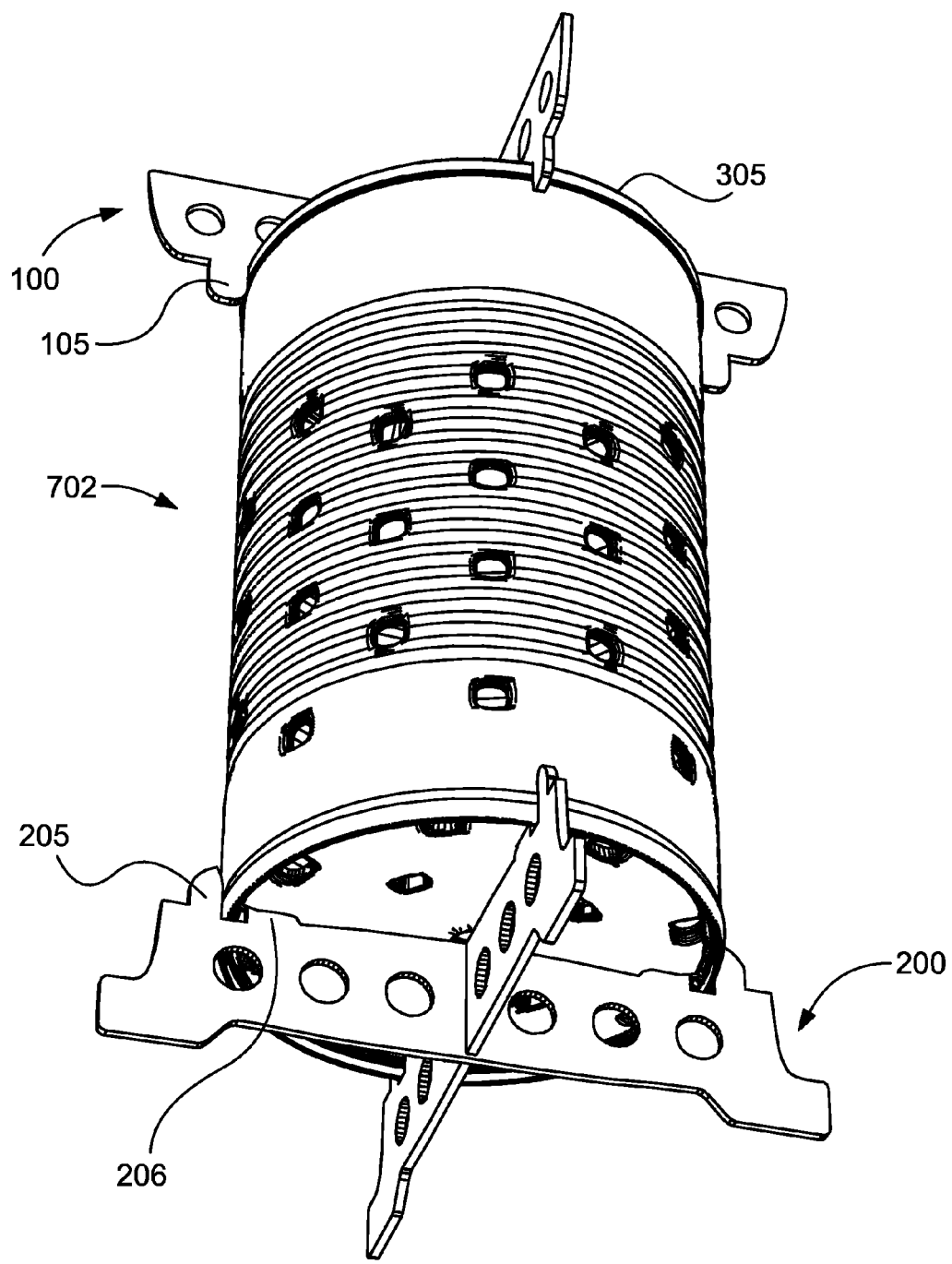
FIG. 14 illustrates a perspective view of the underside of a medium size can with the small cross-member pairs assembled and attached to the can in accordance with an embodiment of the present disclosure.

FIG. 14 illustrates a perspective view of the underside of a medium size can with the small cross-member pairs assembled and attached to the can in accordance with an embodiment of the present disclosure. The perspective view illustrates the underside of a medium size can with the small size cross-member pairs 100 and 200 assembled and attached to the can. The can wall is gripping the inside of the outer tabs 205 of the lower cross-members 200. The inner tabs 206 have also been pushed into slots created in the bottom of the can.

Figure 15:
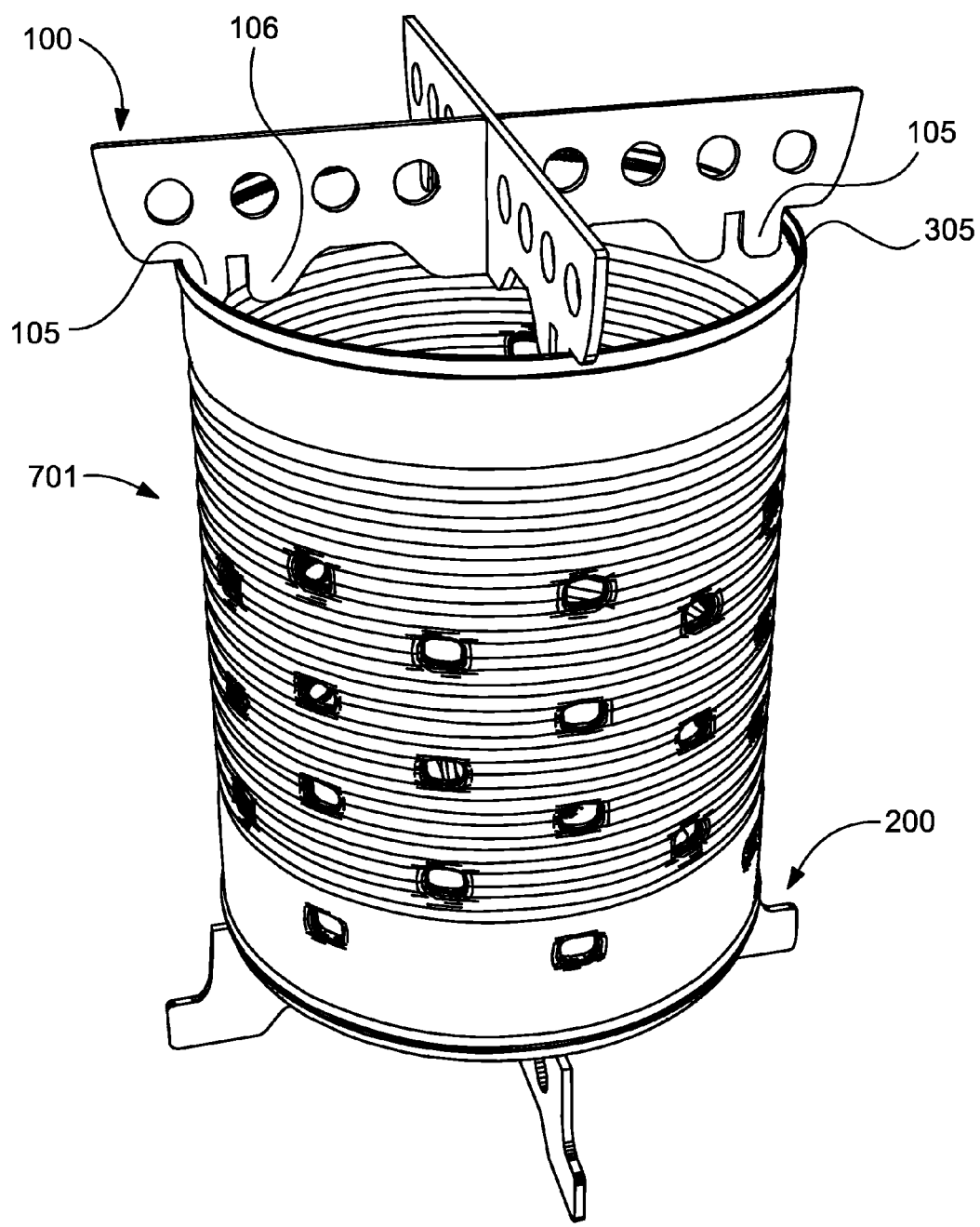
FIG. 15 illustrates a perspective view of the top of a large size can with the small cross-member pairs assembled and attached to the can in accordance with an embodiment of the present disclosure.

FIG. 15 illustrates a perspective view of the top of a large size can with the small cross-member pairs assembled and attached to the can in accordance with an embodiment of the present disclosure. The perspective view illustrates the top of a large size can 701 with the small size cross-member pairs 100 and 200 assembled and attached to the can. The can lip 305 is gripping the outside of the outer tabs 105 of the upper cross-members.

Figure 16:
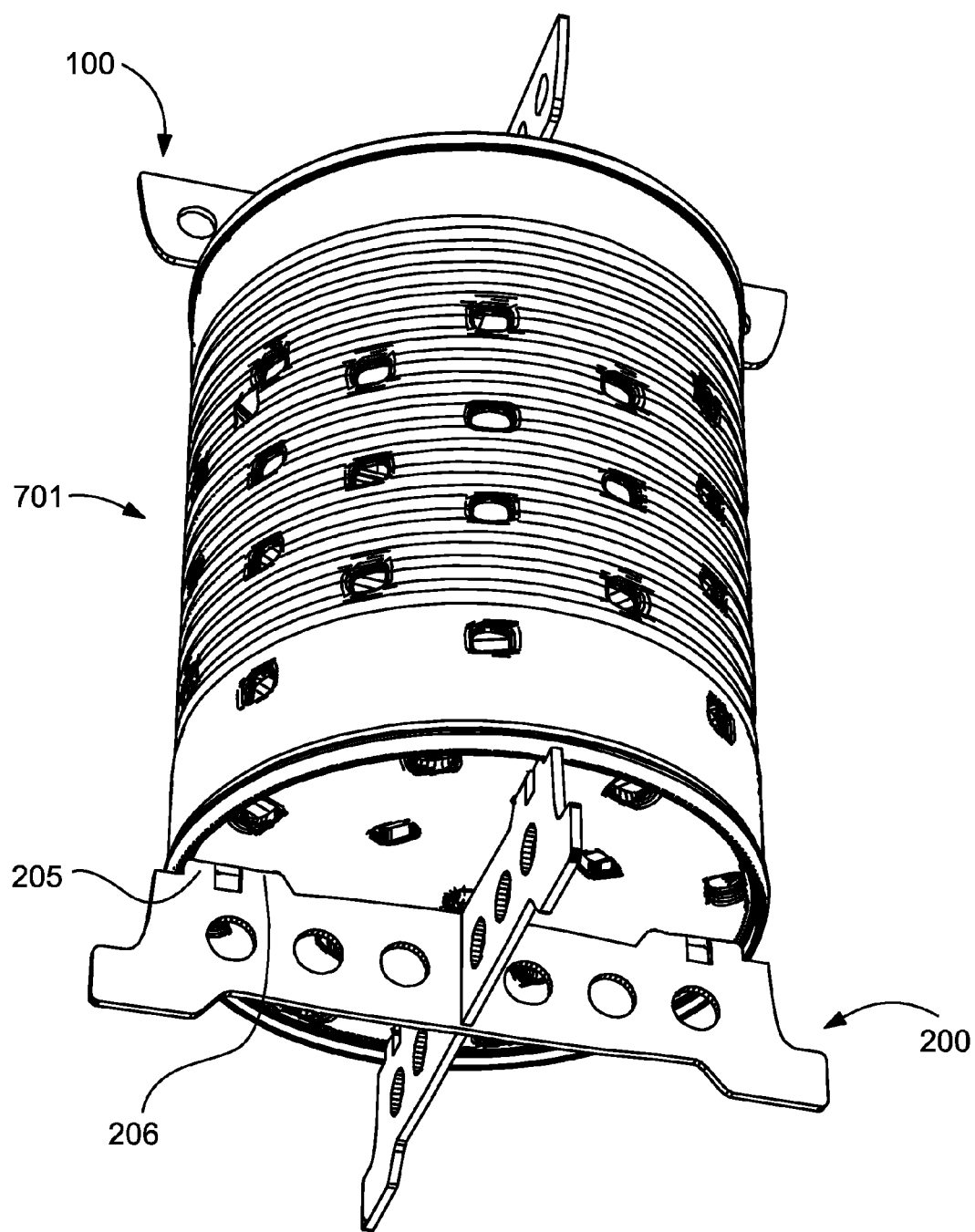
FIG. 16 illustrates a perspective view of the underside of a large size can with the small cross-member pairs assembled and attached to the can in accordance with an embodiment of the present disclosure.

FIG. 16 illustrates a perspective view of the underside of a large size can with the small cross-member pairs assembled and attached to the can in accordance with an embodiment of the present disclosure. The perspective view illustrates the underside of a large size can 701 with the small size cross-member pairs 100 and 200 assembled and attached to the can. The lower can rim can be seen gripping the outside of the outer tabs 205 of the lower cross-members. The inner and outer cross-members, 205 and 206 respectively, have been pushed into slots created in the bottom of the can.

Figure 17:
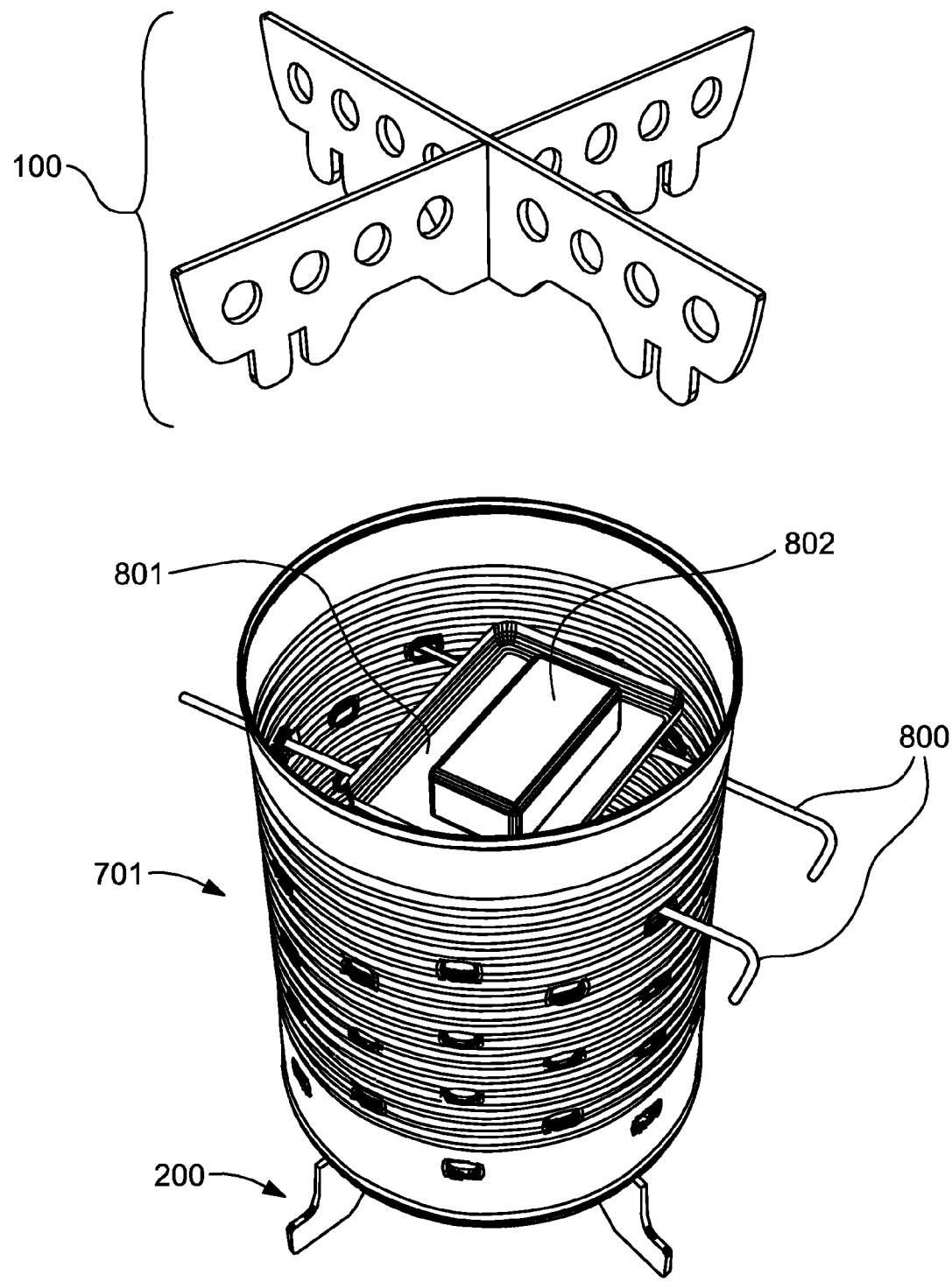
FIG. 17 illustrates a perspective view of the top of a can in which tent pegs, thin rods, or coat hanger wires have been inserted through holes in the can walls in accordance with an embodiment of the present disclosure.

FIG. 17 illustrates a perspective view of the top of a can in which tent pegs, thin rods, or coat hanger wires have been inserted through holes in the can walls in accordance with an embodiment of the present disclosure. The perspective view illustrates the top of a large can 701 in which tent pegs, thin rods or coat hanger wires 800 have been inserted through holes in the can walls. A metal tray 801 holding a block of solid fuel 802 such as an Esbit™ cube has been placed on the tent pegs 800. This arrangement allows the stove to be used with alternative fuel sources. The upper cross-members 100 are seen detached from the can to allow the fuel to be placed inside the can. The upper cross-members 100 can be pushed back down onto the can rim prior to use of the stove. FIG. 17 illustrates a perspective view of the top of a can in which tent pegs, thin rods, or coat hanger wires have been inserted through holes in the can walls in order to provide elevated support for a liquid, gas or solid source, which may be used inside the stove as an alternative to wood fuel, in accordance with an embodiment of the present disclosure.

Figure 18:
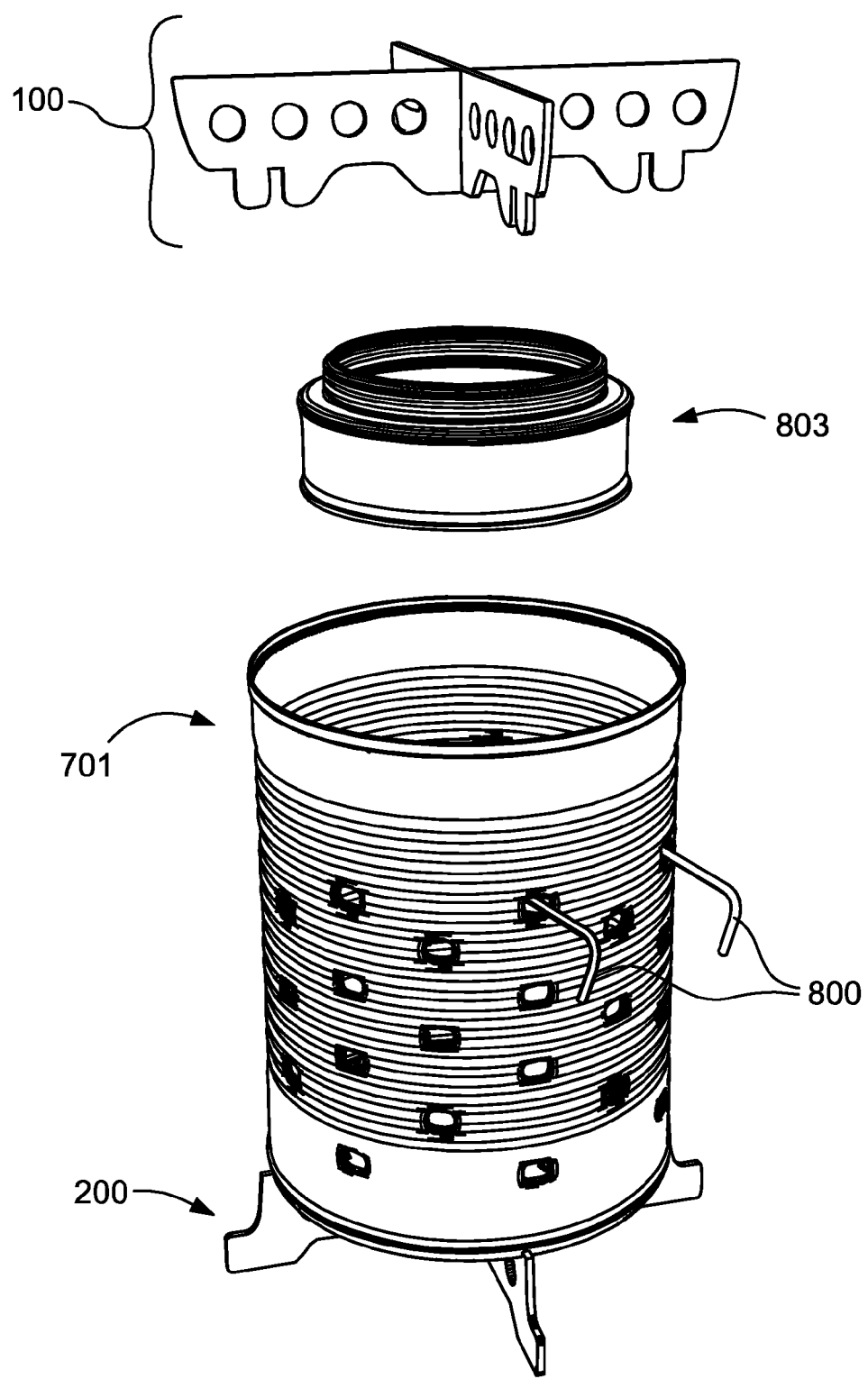
FIG. 18 illustrates a perspective view of a can in which tent pegs, thin rods, or coat hanger wires have been inserted through holes in the can walls in accordance with an embodiment of the present invention.

FIG. 18 illustrates a perspective view of a can in which tent pegs, thin rods, or coat hanger wires have been inserted through holes in the can walls in accordance with an embodiment of the present invention. The perspective view illustrates a large can 701 in which tent pegs, thin rods or coat hanger wires 800 have been inserted through holes in the can walls. A compact liquid fuel source such as a Trangia™ burner or a home-made "soda can stove" 803 depicted here above the can may be placed on the tent pegs inside the can. The upper cross-members 100 depicted above can be pushed back down onto the can rim after the fuel source 803 has been placed in the can. FIG. 18 illustrates a perspective view of the top of a can in which tent pegs, thin rods, or coat hanger wires have been inserted through holes in the can walls in order to provide elevated support for a liquid, gas or solid source, which may be used inside the stove as an alternative to wood fuel, in accordance with an embodiment of the present disclosure.

Figure 19:
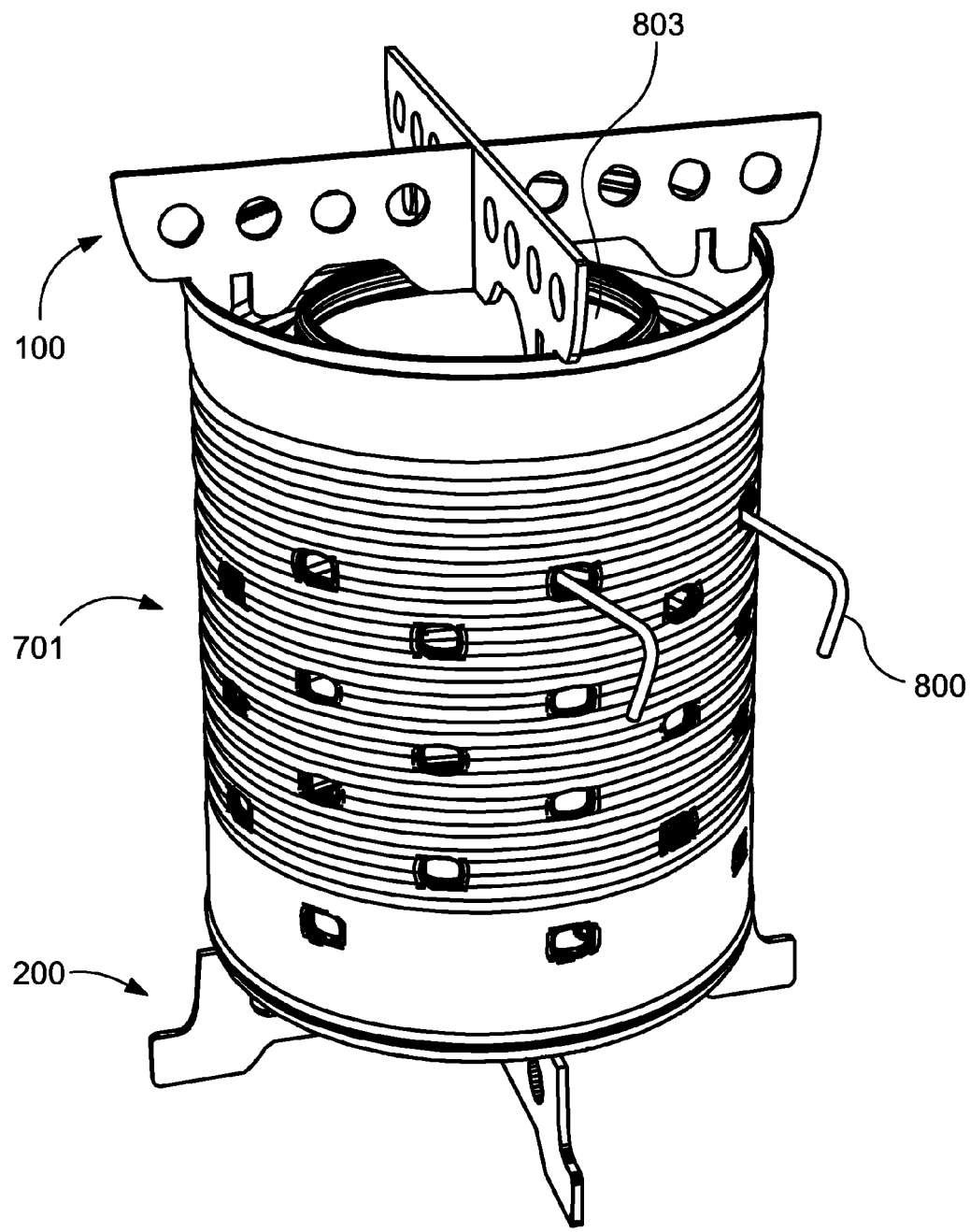
FIG. 19 illustrates a perspective view of a can in which tent pegs or wires have been inserted through holes in the can walls in accordance with an embodiment of the present disclosure.

FIG. 19 illustrates a perspective view of a can in which tent pegs or wires have been inserted through holes in the can walls in accordance with an embodiment of the present disclosure. The perspective view illustrates a large can 701 in which tent pegs 800 or wires have been inserted through holes in the can walls. A compact liquid fuel source such as an Trangia™ burner or a home-made "soda can stove" 803 depicted inside the can resting on the tent pegs 800. The upper cross-members 100 have been pushed back down onto the can rim and the stove is now ready for use. The fuel source can be ignited by dropping a match into it from above. FIG. 19 illustrates a perspective view of the top of a can in which tent pegs, thin rods, or coat hanger wires have been inserted through holes in the can walls in order to provide elevated support for a liquid, gas or solid source, which may be used inside the stove as an alternative to wood fuel, in accordance with an embodiment of the present disclosure.

Figures 20A, 20B:
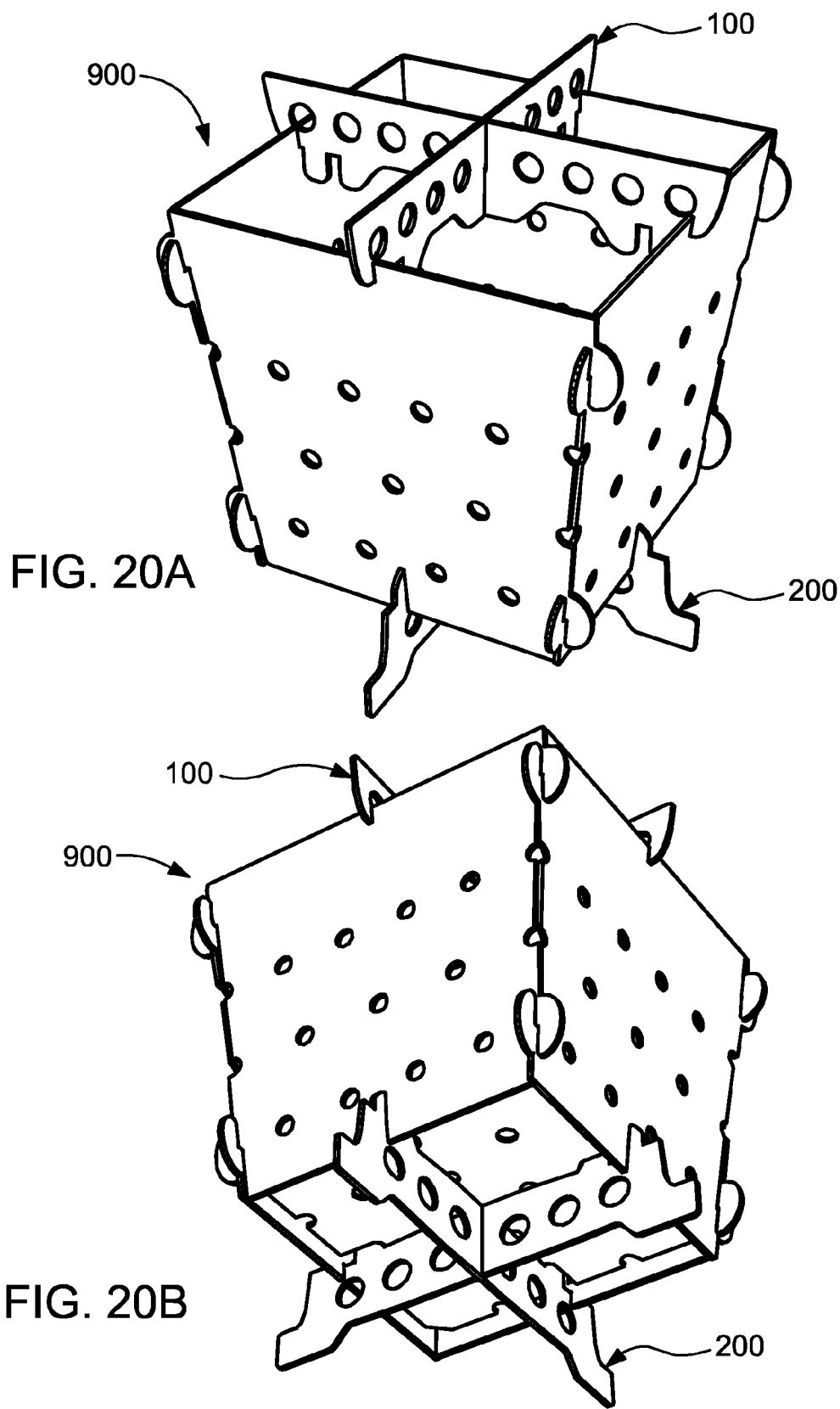
FIG. 20A illustrates a perspective view of the top of the small cross-members attached to a collapsible flat-sided fire-container in accordance with an embodiment of the present disclosure.
FIG. 20B illustrates a perspective view of the underside of the small cross-members attached to a collapsible flat-sided fire-container in accordance with an embodiment of the present disclosure.

FIG. 20A illustrates a perspective view of the top of the small cross-members attached to a collapsible flat-sided fire-container in accordance with an embodiment of the present disclosure. The perspective view illustrates the top of the upper and lower small cross-members 100 and 200 attached to a collapsible flat-sided fire-container 900. The walls and floor of said flat sided fire-container 900 interlock with each other and with the cross-members to provide a secure fire container and stable platform for cooking. The interlocking walls are tapered from a larger top edge to a smaller bottom edge and form a larger perimeter at the top edge thereof and a smaller perimeter at the bottom edge thereof, the floor plate disposed adjacent the bottom edge perimeter. The interlocking walls therefore may form a trapezoidal geometry configured to increase a surface area for air to enter and exit from holes the container walls and therefore encourage combustion of the flammable material therein. A larger end of the trapezoid may be disposed adjacent the lower members for a lower center of gravity and a more stable configuration but the larger end may also be disposed adjacent the upper members.

FIG. 20B illustrates a perspective view of the underside of the small cross-members attached to a collapsible flat-sided fire-container in accordance with an embodiment of the present disclosure. The perspective view illustrates the underside of the upper and lower small cross-members 100 and 200 attached to a collapsible flat-sided fire-container 900. The walls and floor of said flat sided fire-container 900 interlock with each other and with the cross-members to provide a secure fire container and stable platform for cooking.

Figure 21:
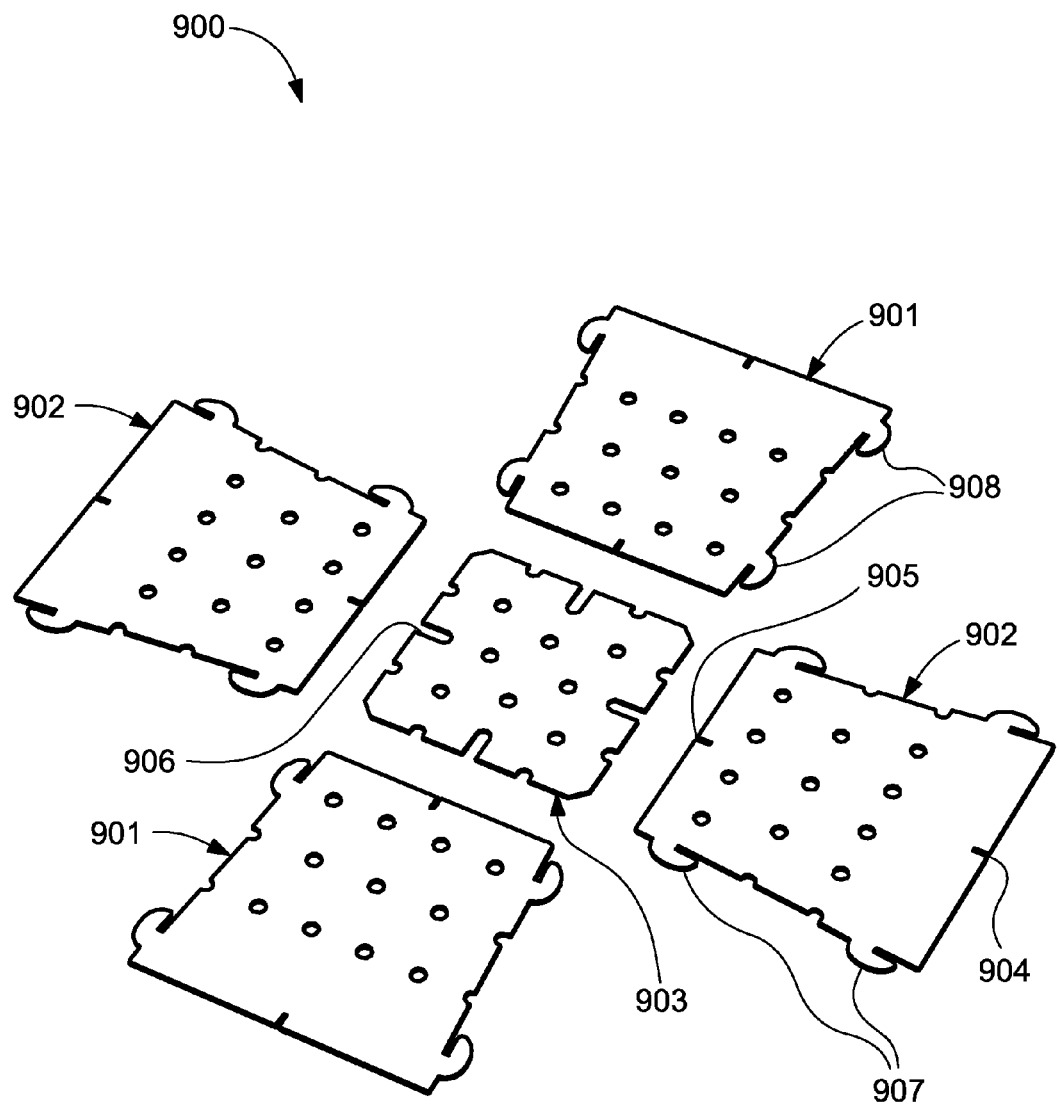
FIG. 21 illustrates a perspective view of the individual plates that make up the walls and floor of the flat-sided fire-container laid flat in accordance with an embodiment of the present disclosure.

FIG. 21 illustrates a perspective view of the individual plates that make up the walls and floor of the flat-sided fire-container laid flat in accordance with an embodiment of the present disclosure. The individual plates that make up the walls and floor of the flat-sided fire-container 900 are illustrated flat. Two opposing walls 901 have downward-pointing locking tabs 908 that lock into the upward pointing tabs 907 of the other two opposing walls 902. Notches 904 in the top edges of the walls 901 and 902 interlock with the upper cross-members (cross-members not depicted in this figure) and notches 905 in the bottom edges of the walls interlock with the lower cross-members. When not in use these wall and floor plates 901 and 902 can be stacked together and stored in a compact pouch, bag or container. Notches 906 in the floor plate 903 interlock with the lower cross-members.

Figure 22:
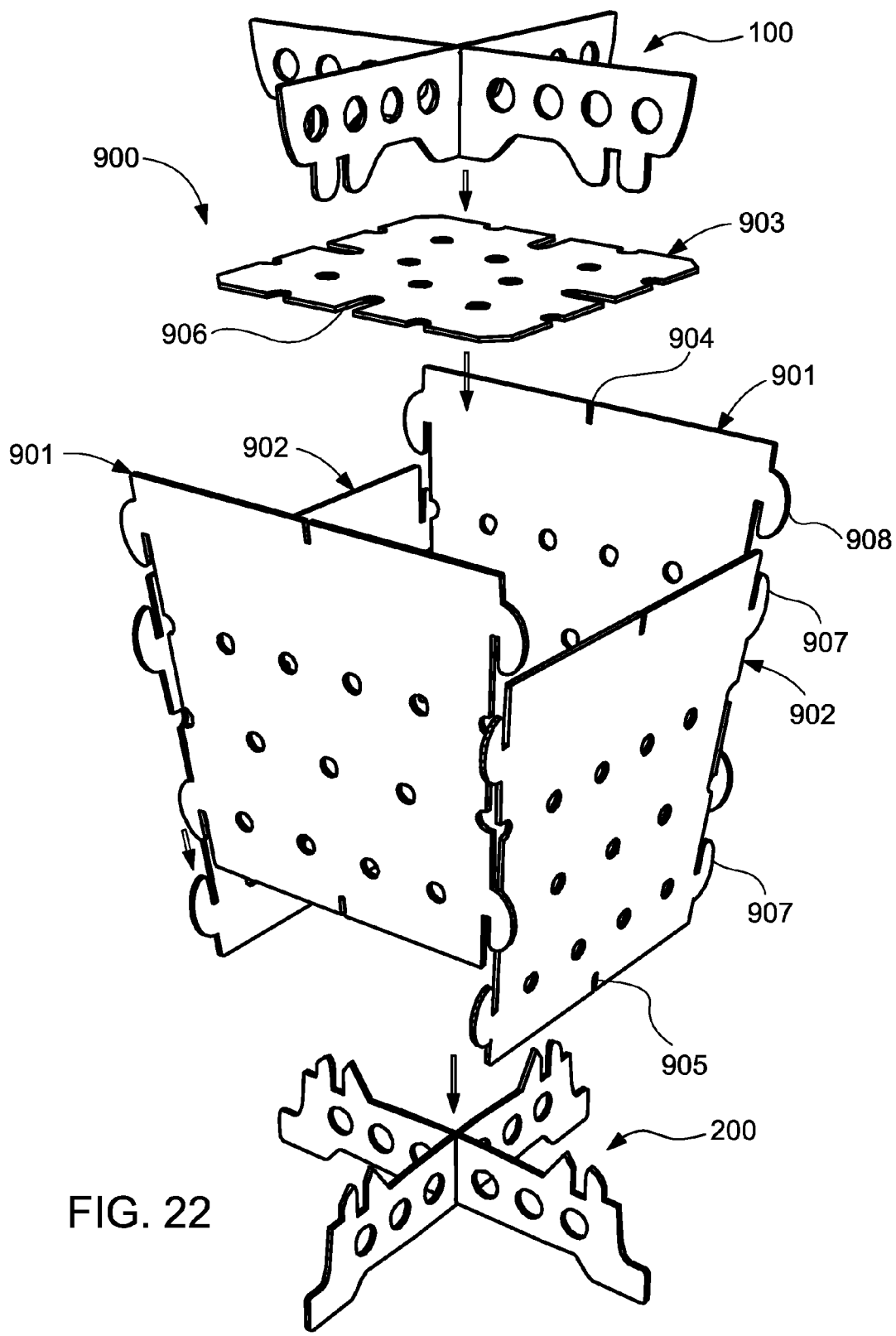
FIG. 22 illustrates a perspective view of the individual interlocking plates that make up the walls and floor of the flat-sided fire-container in the process of being assembled in accordance with an embodiment of the present disclosure.

FIG. 22 illustrates a perspective view of the individual interlocking plates that make up the walls and floor of the flat-sided fire-container in the process of being assembled in accordance with an embodiment of the present disclosure. The perspective view illustrates the individual interlocking plates that make up the walls 901 and 902 and floor 903 of the flat-sided fire-container 900 in the process of being assembled together.

Figure 23A:
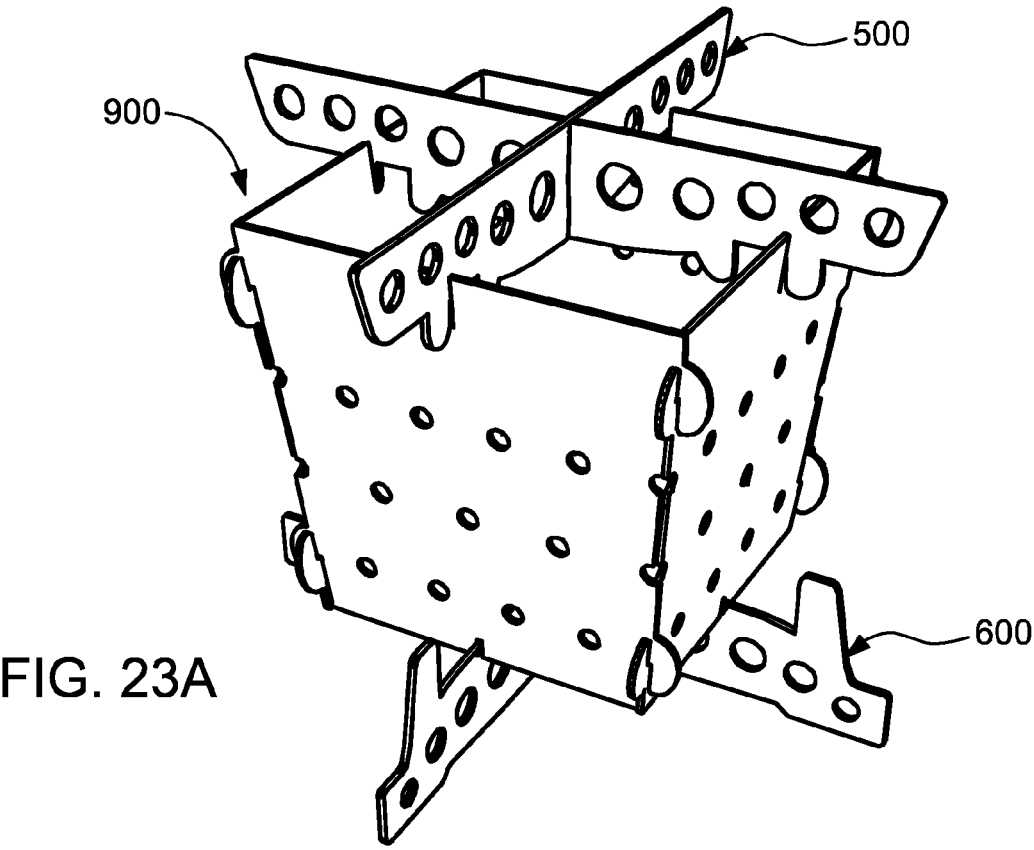
FIG. 23A illustrates a perspective view of the top of the large cross-members attached to a collapsible flat-sided fire-container in accordance with an embodiment of the present disclosure.

FIG. 23A illustrates a perspective view of the top of the large cross-members attached to a collapsible flat-sided fire-container in accordance with an embodiment of the present disclosure. The perspective view illustrates the top of the large cross-members 500 and 600 attached to a collapsible flat-sided fire-container 900.

Figure 23B:
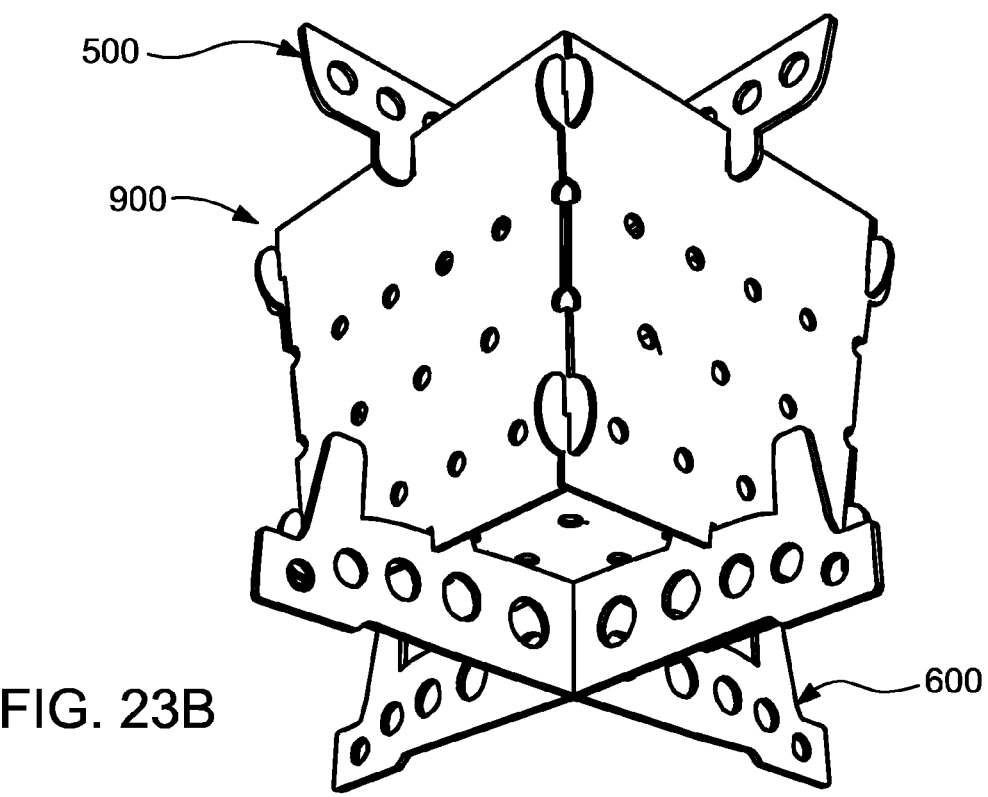
FIG. 23B illustrates a perspective view of the underside of the large cross-members attached to a collapsible flat-sided fire-container in accordance with an embodiment of the present disclosure.

FIG. 23B illustrates a perspective view of the underside of the large cross-members attached to a collapsible flat-sided fire-container in accordance with an embodiment of the present disclosure. The perspective view illustrates the underside of the large cross-members 500 and 600 attached to a collapsible flat-sided fire-container 900.

FIG. 24A illustrates a perspective view of a toaster attachment or accessory which may be hung from the upper edge of either a can stove or the collapsible flat-sided fire-container in accordance with an embodiment of the present disclosure. The perspective view illustrates a toaster attachment or accessory 1000 which can be hung by hooks 1001 or other means from the upper edge of either a can stove 300 or the collapsible flat-sided fire-container 900. When installed and in use on the side of either stove configuration, each said toaster attachment 1000 is able to hold a slice of bread 1002 in proximity to the hot sides of the stove. In each figure only two toaster attachments 1000 are depicted but, up to four of these toaster attachments can be hung from either stove, one on each side.

FIG. 24B illustrates a perspective view of the toaster accessory disposed on the can secured to the lower cross-members in accordance with an embodiment of the present disclosure. The toasters as depicted may be comprised of bonded wires bent into shape, but could optionally be made from sheets of metal bent into a similar shape such that they are capable of holding a slice of bread adjacent to the stove and allowing the conduction of heat from the stove walls to the bread slice.

FIG. 24C illustrates a perspective view of the toaster accessory disposed on the collapsible flat-sided fire-container in accordance with an embodiment of the present disclosure. Reference numbers similar to or the same as reference numbers in other drawings may identify similar or same elements described immediately herein and in other supporting descriptions.

A method of making a portable camping and survival stove is also disclosed. The method comprising providing the stand and the cook top and securing the lower container edge onto the upper edge of the lower cross-members and securing the upper container edge onto the lower edge of the upper cross-members. An embodiment of the disclosure further includes securing the lower container edge onto the shelf between the lower cross-member double tabs and securing the upper container edge onto the shelf between the upper cross-member double tabs.

Although the operations of the method(s) herein are shown and described in a particular order, the order of the operations of each method may be altered so that certain operations may be performed in an inverse order or so that certain operations may be performed, at least in part, concurrently with other operations. In embodiments, instructions or sub-operations of distinct operations may be implemented in an intermittent and/or alternating manner. Notwithstanding specific embodiments of the invention have been described and illustrated, the invention is not to be limited to the specific forms or arrangements of parts so described and illustrated. The scope of the invention is defined by the claims and their equivalents herein.

What is claimed is:

1. A portable camping and survival stove for a can, comprising:
    a stand accessory comprising a pair of flat stock lower cross-members adjoined via a complementary slot in each member, each lower cross-member having two ends
    between a lower edge and a single pair of tabs proximal each end spaced apart to define on an upper receding smooth edge there between configured to receive a bottom end of the can and to secure on an interstitial shelf between the pair of tabs a bottom end lower edge of the can a container based on a puncture and insertion up to the interstitial shelf of at least one tab into the bottom end of the can; and
    a cook top accessory comprising a pair of flat stock upper cross-members adjoined via a complementary slot in each member, each upper cross-member having two ends between an upper cooking edge and a pair of tabs proximal each end spaced apart on a lower receding smooth edge configured to secure on an interstitial shelf between the pair of tabs an upper edge of the can container and the upper cooking edge configured to receive a cook accessory,
    wherein an inner tab of the pair of tabs proximal each lower cross-member end comprises a single tapered point configured to puncture the bottom of the can and therefore further secure the can to the cross-members, and
    wherein the interstitial shelf space between the pair of tabs on the lower and upper cross-members is equal to or greater than a width of a tab in order to accommodate the bottom end edge of the can.

2. The portable camping and survival stove of claim 1, wherein each lower cross-member comprises feet configured to offset the cross-member from a lower edge thereof.

3. The portable camping and survival stove of claim 1, wherein the interstitial shelf space between tabs measures approximately 3.12 mm to 11 mm in order to shelf a variety of common can container sizes thereon.

4. The portable camping and survival stove of claim 1, further comprising an outer shelf on the lower and on the upper cross-members, each outer shelf disposed adjacent the pair of tabs, each outer shelf configured to receive a bottom end edge of one of a plurality of can sizes based on a puncture of the pair of tabs into the bottom of the can.

5. The portable camping and survival stove of claim 1, wherein the upper cross-members comprise at least one of a flammable resistant material, an anti-flammable material and a composite material(s) thereof.

6. A portable camping and survival stove, comprising:
    a stand accessory comprising a pair of flat stock lower cross-members adjoined via a complementary slot in each member, each lower cross-member having two ends
    between a lower edge and a single pair of tabs proximal each end spaced apart to define on an upper receding smooth edge there between configured to receive a bottom end of the can and to secure on an interstitial shelf between the pair of tabs a bottom end lower edge of the can a container based on a puncture and insertion up to the interstitial shelf of at least one tab into the bottom end of the can; and
    a cook top accessory comprising a pair of flat stock upper cross-members adjoined via a complementary slot in each member, each upper cross-member having two ends between an upper cooking edge and a pair of tabs proximal each end spaced apart on a lower receding smooth edge configured to secure on an interstitial shelf between the pair of tabs an upper edge of the can container and the upper cooking edge configured to receive a cook accessory,
    wherein an inner tab of the pair of tabs proximal each lower cross-member end comprises a single tapered point configured to Puncture the bottom of the can and therefore further secure the can to the cross-members, and
    wherein the interstitial shelf space between the pair of tabs on the lower and upper cross-members is equal to or greater than a width of a tab in order to accommodate the bottom end edge of the can; and
    a rigid container comprising holes for air flow in a bottom and at least one side thereof, the container configured to contain flammable material and have a lower edge and an upper edge.

7. The portable camping and survival stove of claim 6, wherein the rigid container comprises four substantially flat interlocking walls and a substantially flat floor plate, the walls configured to secure to the lower and upper cross-members and otherwise be collapsible.

8. The portable camping and survival stove of claim 7, wherein the walls are configured to interlock via complementary notched tabs, a first wall and a third wall having downward facing tabs and an adjacent second and fourth walls having complementary upward facing tabs.

9. The portable camping and survival stove of claim 8, wherein the interlocking walls are tapered from a larger top edge to a smaller bottom edge and form a larger perimeter at the top edge thereof and a smaller perimeter at the bottom edge thereof, the floor plate disposed adjacent the bottom edge perimeter.

10. The portable camping and survival stove of claim 9, further comprising notches in a top edge of each of the four walls, the notches configured to receive a lower edge of an upper cross-member.

* * * * *